United States Patent
Bai

(10) Patent No.: US 7,720,391 B2
(45) Date of Patent: *May 18, 2010

(54) SYSTEM AND METHOD FOR GENERATING OPTICAL RETURN-TO-ZERO SIGNALS WITH ALTERNATING BI-PHASE SHIFT

(75) Inventor: Yu Sheng Bai, Los Altos Hills, CA (US)

(73) Assignee: FutureWei Technologies, Inc., Plano, TX (US)

( * ) Notice: Subject to any disclaimer, the term of this patent is extended or adjusted under 35 U.S.C. 154(b) by 982 days.

This patent is subject to a terminal disclaimer.

(21) Appl. No.: 11/336,658

(22) Filed: Jan. 20, 2006

(65) Prior Publication Data
US 2006/0193229 A1    Aug. 31, 2006

Related U.S. Application Data

(60) Provisional application No. 60/656,610, filed on Feb. 25, 2005.

(51) Int. Cl.
*H04B 10/04* (2006.01)

(52) U.S. Cl. .................. 398/183; 398/186; 398/188; 398/189; 398/192; 398/193; 398/194; 359/245; 359/248; 359/237; 359/238; 385/140; 385/14; 385/31; 385/1

(58) Field of Classification Search .............. 398/182, 398/183, 184, 185, 186, 187, 188, 189, 190, 398/191, 192, 193, 194, 199, 200, 201; 359/237, 359/238, 245, 248; 385/140, 14, 31, 1, 2, 385/3
See application file for complete search history.

(56) References Cited

U.S. PATENT DOCUMENTS 5,625,722 A    4/1997  Froberg et al.
6,535,316 B1   3/2003  Mizuhara
6,542,280 B2   4/2003  Walklin
6,731,877 B1   5/2004  Cao
7,346,283 B2 * 3/2008  Kao et al. .............. 398/185

(Continued)

FOREIGN PATENT DOCUMENTS

| CN | 1410800 | 4/2003 |
| CN | 1503500 | 6/2004 |
| CN | 1595843 | 3/2005 |
| EP | 0059758 A1 | 9/1982 |

(Continued)

OTHER PUBLICATIONS

Communication from the European Patent Office of EP Application No. 06 705 683.8-2415, dated Apr. 8, 2008.

(Continued)

Primary Examiner—Hanh Phan
(74) Attorney, Agent, or Firm—Townsend and Townsend and Crew LLP

(57) ABSTRACT

A system and method for generating an optical return-to-zero signal. The system includes a bit separator configured to receive an electrical non-return-to-zero signal and generate a first signal and a second signal, and a driver configured to receive the first signal and the second signal and generate a driving signal. The driving signal is associated with a difference between the first signal and the second signal. Additionally, the system includes a light source configured to generate a light, and an electro-optical modulator configured to receive the light and the driving signal, modulate the light with the driving signal, and generate an optical signal. The electrical non-return-to-zero signal includes a first plurality of bits and a second plurality of bits. The first signal includes the first plurality of bits, and the second signal includes the second plurality of bits. The optical signal is an optical return-to-zero signal.

37 Claims, 14 Drawing Sheets

U.S. PATENT DOCUMENTS

| | | |
|---|---|---|
| 2002/0196508 A1 | 12/2002 | Wei et al. |
| 2004/0109698 A1* | 6/2004 | Kim et al. .................. 398/199 |
| 2005/0019040 A1 | 1/2005 | Trutna |
| 2006/0193228 A1* | 8/2006 | Bai ......................... 369/59.23 |

FOREIGN PATENT DOCUMENTS

| | | |
|---|---|---|
| EP | 0343266 A1 | 11/1989 |
| EP | 0 718 990 A | 6/1996 |
| EP | 1 128 580 A2 | 8/2001 |
| EP | 0 977 382 A2 | 2/2002 |
| JP | 2000-324054 | 11/2000 |
| JP | 2001-326609 | 11/2001 |
| WO | WO 2005/055475 | 6/2005 |

OTHER PUBLICATIONS

Forzati, Marco et al., "Reduction Of Intrachannel Four-Wave Mixing Using The Alternate-Phase RZ Modulation Format," IEEE Photonics Technology Letters, vol. 14, No. 9, pp. 1285-1287, Sep. 2002.

Miyamoto, Y. et al., "320 Gbit/s (8×40 Gbit/s) WDM Transmission Over 367km With 120km Repeater Spacing Using Carrier-Suppressed Return-To-Zero Format," Electronics Letters, vol. 35, No. 23, pp. 2041-2042, Nov. 11, 1999.

* cited by examiner

SYSTEM AND METHOD FOR GENERATING OPTICAL RETURN-TO-ZERO SIGNALS WITH ALTERNATING BI-PHASE SHIFT

CROSS-REFERENCES TO RELATED APPLICATIONS

This application claims priority to U.S. Provisional Application No. 60/656,610, filed Feb. 25, 2005, which is incorporated by reference herein.

The following two commonly-owned co-pending applications, including this one, are being filed concurrently and the other one is hereby incorporated by reference in its entirety for all purposes:

1. U.S. patent application Ser. No. 11/336,658, in the name of Yu Sheng Bai, titled, "System and Method for Generating Optical Return-to-Zero Signals with Alternating Bi-Phase Shift"; and 2. U.S. patent application Ser. No. 11/336,619, in the name of Yu Sheng Bai, titled, "System and Method for Generating Optical Return-to-Zero Signals with Alternating Bi-Phase Shift and Frequency Chirp".

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates in general to telecommunication techniques. More particularly, the invention provides a system and method for generating optical return-to-zero signals with alternating bi-phase shift. Merely by way of example, the invention is described as it applies to optical networks, but it should be recognized that the invention has a broader range of applicability.

Telecommunication techniques have progressed through the years. As merely an example, optical networks have been used for conventional telecommunications in voice and other applications. The optical networks can transmit multiple signals of different capacities. For example, the optical networks terminate signals, multiplex signals from a lower speed to a higher speed, switch signals, and transport signals in the networks according to certain definitions.

In optical communications, an optical signal may transmit a long distance, such as hundreds or even thousands of kilometers, in optical fiber links. The quality of received signals often can be improved by using return-to-zero (RZ) modulations instead of non-return-to-zero (NRZ) modulations. For example, a signal under return-to-zero modulation includes logic low and high states, such as ones represented by "0" and "1" respectively. The signal state often is determined by the voltage during one part of a bit period, and the signal returns to a resting state during another part of the bit period. As an example, the resting state is represented by zero volt. In another example, a signal under non-return-to-zero modulation includes logic low and high states, such as ones represented by "0" and "1" respectively. The signal state often is determined by the voltage during a bit period without the signal returning to a resting state during at least a part of the bit period.

The return-to-zero modulations usually can provide better resistance to signal noises than the non-return-to-zero modulations. Additionally, the isolated RZ pulses often experience nearly identical nonlinear distortions during transmission, which can be at least partially mitigated through proper dispersion compensation schemes. Hence RZ signals usually are more resistant to nonlinear distortions than NRZ signals.

FIG. 1 is a simplified conventional system for generating NRZ signals. The system 100 includes an NRZ source 110, an NRZ data driver 120, a continuous wave (CW) diode laser 130, and a data modulator 140. In contrast, the conventional system for generating RZ signals is often more complicated as shown in FIGS. 2, 3, and 4.

FIG. 2 is a simplified conventional system for generating RZ signals. The system 200 includes an NRZ source 210, a converter 215, an RZ data driver 220, a CW diode laser 230, and a data modulator 240. The data modulator 240 is an electro-optical (EO) modulator. The converter 215 can convert an NRZ signal to an RZ signal in electrical domain. The electrical RZ signal is then used to generate an optical RZ signal through the EO modulator 240. The EO modulator 240 can be either a Mach-Zehnder (MZ) modulator or an electro-optical absorptive modulator. The system 200 often generates simple RZ signals that contain no phase or frequency modulations.

FIG. 3 is another simplified conventional system for generating RZ signals. The system 300 includes an NRZ source 310, an NRZ data driver 320, a CW diode laser 330, a data modulator 340, a clock driver 350, a phase shifter 355, and a clock modulator 360. The data modulator 340 and the clock modulator 360 each are an EO modulator. The EO modulator 360 is driven by a data clock signal or a half-rate data clock signal, and is used to generate optical clock pulses. FIG. 4 is yet another simplified conventional system for generating RZ signals. The system 400 includes an NRZ source 410, an NRZ data driver 420, a directly modulated laser 430, a data modulator 440, a clock driver 450, and a phase shifter 455. The laser 430 is directly modulated with a data clock signal to generate optical clock pulses. With proper arrangements, phase or frequency modulations can be added to the optical clock pulses to generate complex RZ signals.

Among complex RZ signals, the optical carrier-suppressed return-to-zero (CSRZ) signals can provide strong transmission capabilities. For example, the CSRZ signals have alternating bi-phase shifts between adjacent bits, and are less affected by inter-symbol interferences than the simple RZ signals. Thus the CSRZ signals are more tolerant for both dispersions and nonlinear distortions. In another example, the chirped return-to-zero (CRZ) signals have substantially the same frequency chirp on each RZ pulse for a given signal. The frequency chirp can be made to compensate for the chirp induced by nonlinear effects, and further improve tolerance for nonlinear distortions. But the conventional systems for generating these RZ signals often are complex and expensive.

Hence it is highly desirable to improve techniques for generating return-to-zero signals.

BRIEF SUMMARY OF THE INVENTION

The present invention relates in general to telecommunication techniques. More particularly, the invention provides a system and method for generating optical return-to-zero signals with alternating bi-phase shift. Merely by way of example, the invention is described as it applies to optical networks, but it should be recognized that the invention has a broader range of applicability.

According to one embodiment of the present invention, a system for generating an optical return-to-zero signal includes a bit separator configured to receive an electrical non-return-to-zero signal and generate a first signal and a second signal, and a driver configured to receive the first signal and the second signal and generate a driving signal. The driving signal is associated with a difference between the first signal and the second signal. Additionally, the system includes a light source configured to generate a light, and an electro-optical modulator configured to receive the light and the driving signal, modulate the light with the driving signal, and generate an optical signal. The electrical non-return-to-zero signal includes a first plurality of bits and a second plurality of bits. The first signal includes the first plurality of bits, and the second signal includes the second plurality of bits. The optical signal is an optical return-to-zero signal.

According to another embodiment, a system for generating an optical return-to-zero signal includes a bit separator configured to receive an electrical non-return-to-zero signal and generate a first signal and a second signal, and a combiner configured to receive the first signal and the second signal and generate a third signal. The third signal is associated with a sum of the first signal and the second signal. Additionally, the system includes a light source configured to generate a light, and an electro-optical modulator configured to receive the light and a driving signal, modulate the light with the driving signal, and generate an optical signal. The electrical non-return-to-zero signal includes a first plurality of bits and a second plurality of bits. The first signal includes the first plurality of bits, and the second signal includes a third plurality of bits. The third plurality of bits equal to the second plurality of bits multiplied by a negative number in signal strength. The driving signal is proportional to the third signal, and the optical signal is an optical return-to-zero signal.

According to yet another embodiment, a system for generating an optical return-to-zero signal includes a bit separator configured to receive an electrical non-return-to-zero signal and generate a first input signal and a second input signal, and a driver configured to receive the first input signal and the second input signal and generate a first driving signal and a second driving signal. Each of the first driving signal and the second driving is associated with a difference between the first input signal and the second input signal. Additionally, the system includes a light source configured to generate a light, and an electro-optical modulator configured to receive the light, the first driving signal, and the second driving signal, modulate the light with the first driving signal and the second driving signal, and generate an optical signal. The electrical non-return-to-zero signal includes a first plurality of bits and a second plurality of bits. The first input signal includes the first plurality of bits, and the second input signal includes the second plurality of bits. The first driving signal is equal to the second driving signal multiplied by a negative number in signal strength, and the optical signal is an optical return-to-zero signal.

According to yet another embodiment, a system for generating an optical return-to-zero signal includes a bit separator configured to receive an electrical non-return-to-zero signal and generate a first input signal and a second input signal, and a combiner configured to receive the first input signal and the second input signal and generate a third signal. The third signal is associated with a sum of the first input signal and the second input signal. Additionally, the system includes a light source configured to generate a light, and an electro-optical modulator configured to receive the light, a first driving signal, and a second driving signal, modulate the light with the first driving signal and the second driving signal, and generate an optical signal. The electrical non-return-to-zero signal includes a first plurality of bits and a second plurality of bits. The first input signal includes the first plurality of bits, and the second input signal includes a third plurality of bits. The third plurality of bits is equal to the second plurality of bits multiplied by a first negative number in signal strength. Each of the first driving signal and the second driving signal is proportional to the third signal. The first driving signal is equal to the second driving signal multiplied by a second negative number in signal strength. The optical signal is an optical return-to-zero signal.

According to yet another embodiment, an apparatus for separating bits in a signal includes a frequency converter configured to receive a clock signal and generate a first signal. The clock signal is associated with a clock frequency and a clock period, and the first signal is associated with a first frequency and a first period. Additionally, the apparatus includes a time delay device configured to receive the first signal and generate a second signal. The second signal is delayed by a predetermined period with respect to the first signal. Moreover, the apparatus includes a first AND gate configured to receive an input signal and the first signal, and generate a third signal. Also, the apparatus includes a second AND gate configured to receive the input signal and the second signal, and generate a fourth signal. The input signal includes a first plurality of bits and a second plurality of bits. The first signal includes the first plurality of bits but does not include the second plurality of bits. The second signal includes the second plurality of bits but does not include the first plurality of bits.

According to yet another embodiment, an apparatus for separating bits in a signal includes a demultiplexer configured to receive an input signal and generate a first plurality of signals and a second plurality of signals, a first multiplexer including a first plurality of input terminals and a second plurality of input terminals and configured to generate a first signal, and a second multiplexer including a third plurality of input terminals and a fourth plurality of input terminals and configured to generate a second signal. The first plurality of input terminals is configured to receive the first plurality of signals, and the fourth plurality of input terminals is configured to receive the second plurality of signals. The second plurality of input terminals and the third plurality of terminals are biased to a predetermined voltage. The input signal includes a first plurality of bits and a second plurality of bits. Each of the first plurality of signals includes one of the first plurality of bits, and each of the second plurality of signals includes one of the second plurality of bits. Each of the first plurality of bits and the second plurality of bits is included in only one of the first plurality of signals and the second plurality of signals.

Many benefits are achieved by way of the present invention over conventional techniques. Some embodiments of the present invention provide systems and methods for generating optical carrier-suppressed return-to-zero (CSRZ) signals. Certain embodiments of the present invention provides systems and methods that separate an electrical non-return-to-zero (NRZ) signal into an "even bit signal" and an "odd bit signal", and then combine the two signals differentially to drive Mach-Zehnder (MZ) electro-optical (EO) modulators to generate an optical CSRZ signal. Some embodiments of the present invention provide systems and methods that use only components designed for NRZ transmitters to generate optical CSRZ signals. For example, only one MZ data modulator is used to generate the CSRZ signals. Certain embodiments of the present invention can significantly lower the cost of a transmitter for optical CSRZ signals. Some embodiments of the present invention can significantly reduce the complexity of a transmitter for optical CSRZ signals. Certain embodiments of the present invention can improve reliability of a transmitter for optical CSRZ signals. Some embodiments of the present invention can significantly improve performance of a fiber optical transport system. For example, the fiber optical transport system is used for transmission at a high data rate, such as a rate higher than 10 Gbps.

Certain embodiments of the present invention provide systems and methods that generate two half-rate electrical return-to-zero (eRZ) signals and combine these two signals differentially with a differential amplifier to drive a single drive Mach-Zehnder modulator biased at null to generate a full rate optical CSRZ signal. Some embodiments of the present invention provide systems and methods that generate two half-rate electrical return-to-zero (eRZ) signals and combine these two signals differentially with a differential amplifier to drive a dual drive Mach-Zehnder modulator biased at null to generate a full rate optical CSRZ signal.

Certain embodiments of the present invention provide systems and methods that separate an electrical non-return-to-zero (NRZ) signal into an "even bit signal" and an "odd bit signal", and then combine these two signals differentially with a differential amplifier to drive a single drive Mach-Zehnder modulator to generate an optical CSRZ signals. Some embodiments of the present invention provide systems and methods that separate an electrical non-return-to-zero (NRZ) signal into an "even bit signal" and an "odd bit signal", and then combine these two signals differentially with a differential amplifier to drive a dual drive Mach-Zehnder modulator to generate an optical CSRZ signals.

Certain embodiments of the present invention provide systems and methods that use AND gates to generate an "even bit signal" and an "odd bit signal". Some embodiments of the present invention provide systems and methods that use parallel-to-serial multiplexers to generate an "even bit signal" and an "odd bit signal".

Depending upon embodiment, one or more of these benefits may be achieved. These benefits and various additional objects, features and advantages of the present invention can be fully appreciated with reference to the detailed description and accompanying drawings that follow.

DETAILED DESCRIPTION OF THE INVENTION

The present invention relates in general to telecommunication techniques. More particularly, the invention provides a system and method for generating optical return-to-zero signals with alternating bi-phase shift. Merely by way of example, the invention is described as it applies to optical networks, but it should be recognized that the invention has a broader range of applicability.

Figure 1:
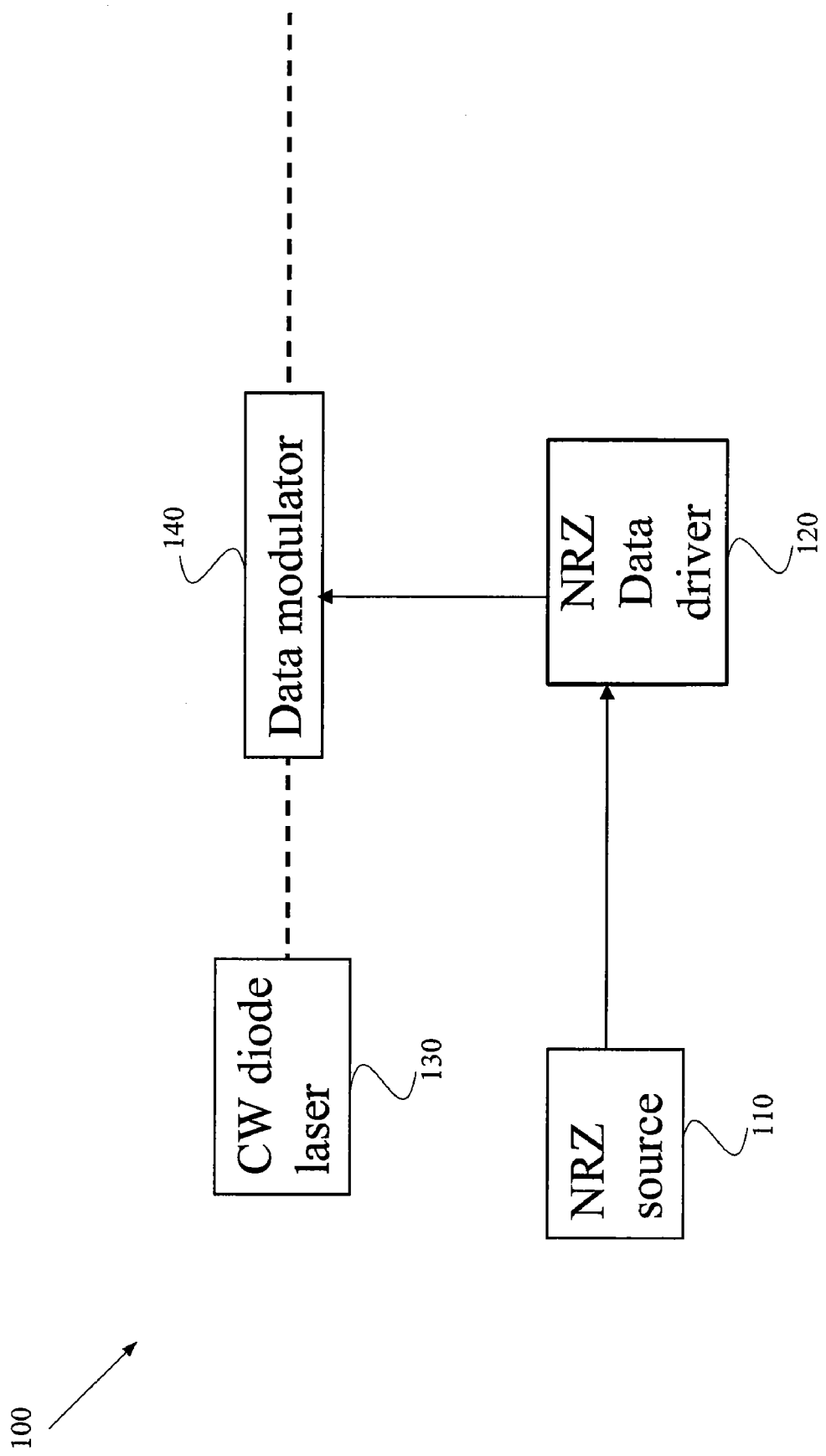
FIG. 1 is a simplified conventional system for generating NRZ signals.
Figure 2:
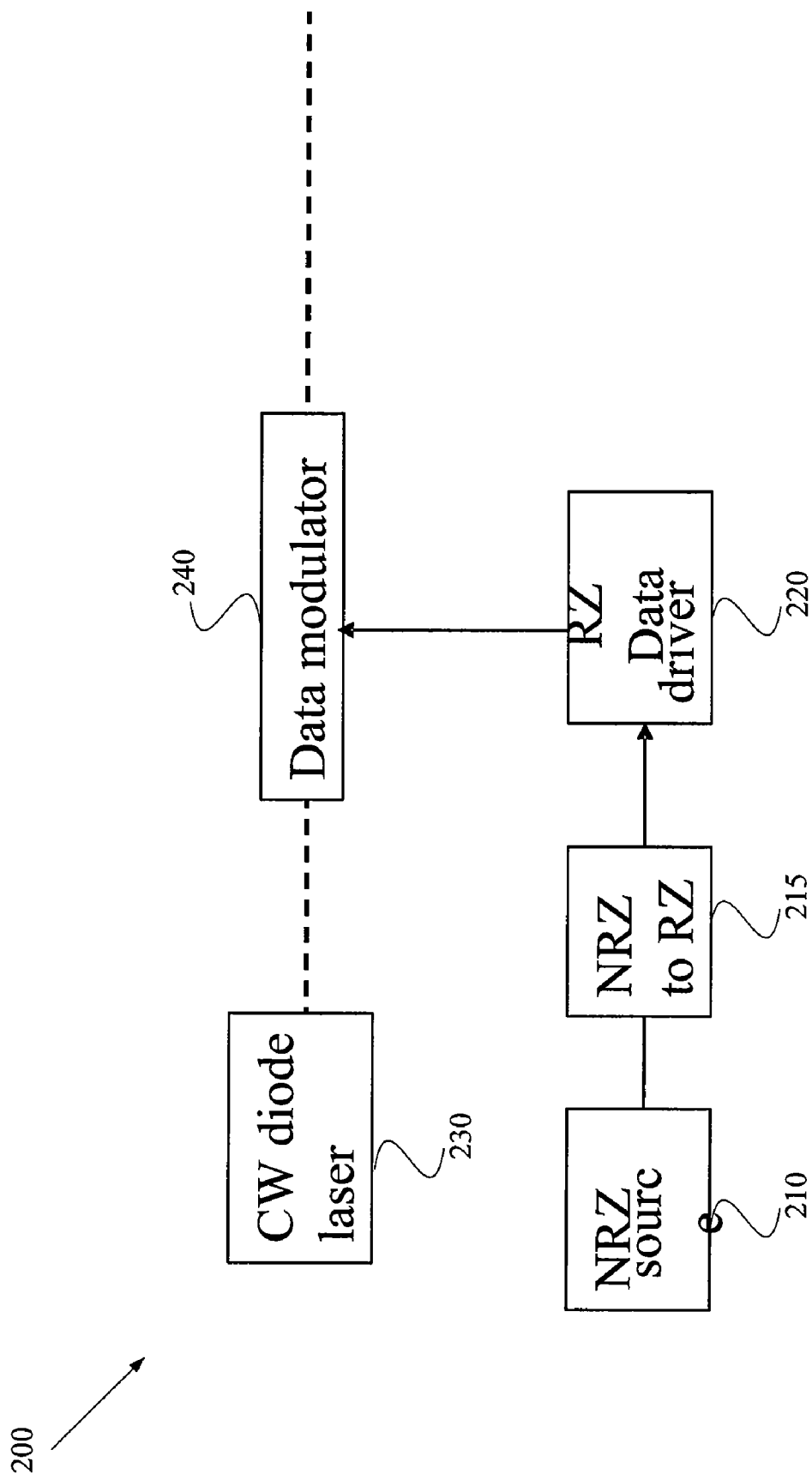
FIG. 2 is a simplified conventional system for generating RZ signals.

As shown in FIG. 2, the system 200 performs optical RZ modulations by generating RZ driving signals in electrical domain. The RZ pulses often occupy 50%, or less, of the bit period. Consequently, the generation of electrical RZ driving signals often needs to use circuit devices that have a radio-frequency (RF) bandwidth twice as wide as that needed for an NRZ electrical circuit. These wide-band components, such as wide-band drivers and/or wide-band amplifiers, usually are more expensive than the corresponding NRZ components. Additionally, the converter between electrical NRZ signals and electrical RZ signals often is a nonstandard part, and hence can be very expensive. Moreover, the system 200 usually generates intensity-modulated RZ signals with about 50% duty cycle, which often results in only marginal improvement over NRZ signals.

Figure 3:
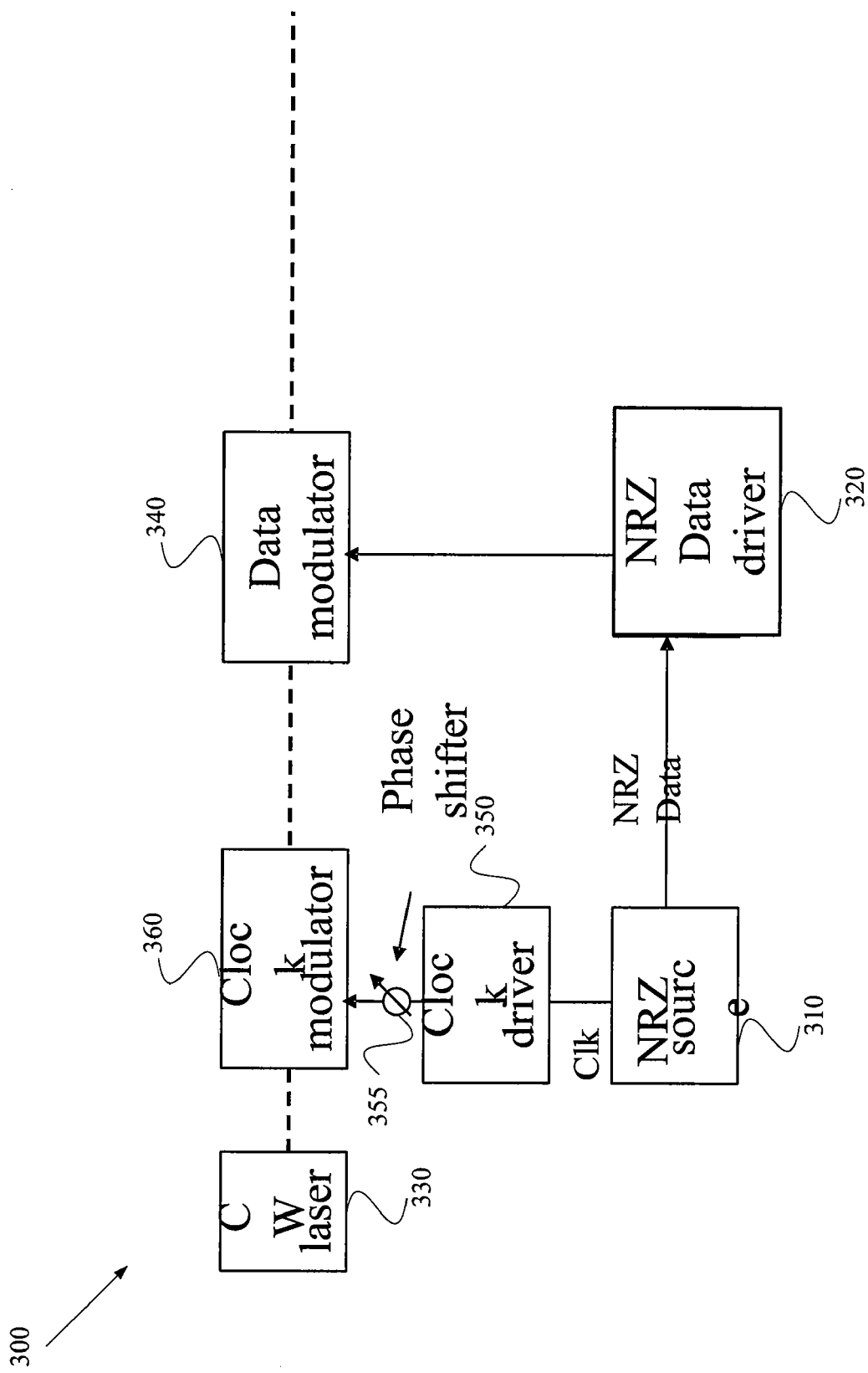
FIG. 3 is another simplified conventional system for generating RZ signals.
Figure 4:
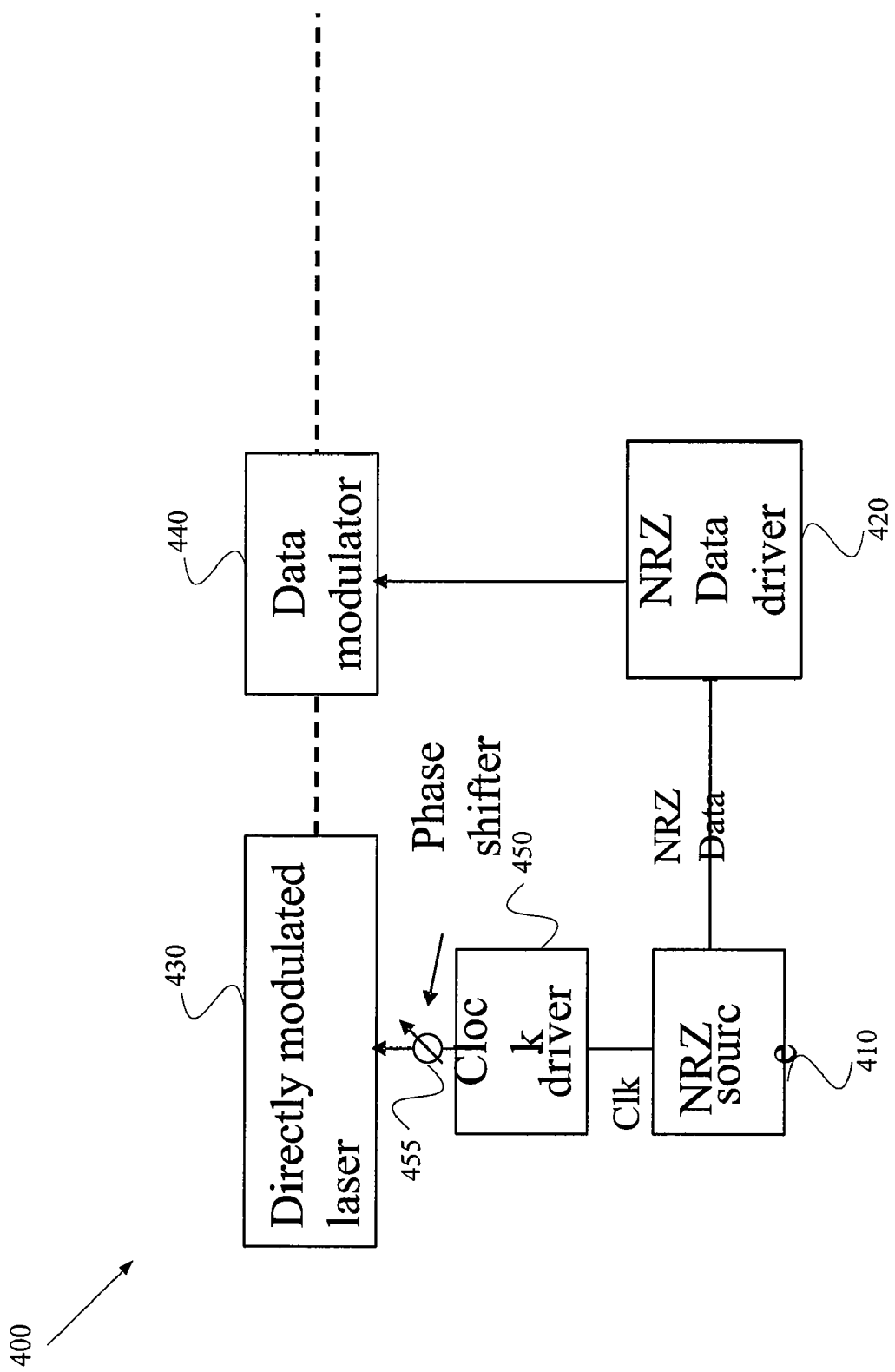
FIG. 4 is yet another simplified conventional system for generating RZ signals.

As shown in FIG. 3, the system 300 uses two EO modulators and related driving circuits to perform optical double modulations. For example, a first MZ modulator is used for clock-pulse modulations, and a second MZ modulator is used for data modulations. The clock pulses received by the first MZ modulator are often generated by nonstandard parts, which can be very expensive. Additionally, the optical data modulations and the optical clock modulations usually need to overlap temporally, so the clock pulses should be kept substantially at the center of the bit slot. But keeping the clock pulses substantially at the center of the bit slot is often difficult to achieve under various operating conditions or over a large temperature range.

To address these issues, the operation principle of a conventional MZ modulator is analyzed as follows. For a conventional MZ modulator, an incoming optical field is separated into two portions with equal strength. After each portion passes through a path with a certain optical length, the two portions are recombined at the output. Due to the interference effect, the output optical field varies with optical length difference between the two paths. There are electrodes coated along the two paths, and the optical path difference can be varied with the electrical voltages applied on the electrodes through electro-optical (EO) effect. By modulating the applied voltages, the output optical field, and hence the optical intensity is modulated. Mathematically, the output optical field is related to the input by:

$$E_{OUT}=E_{IN}/2 \cdot \{\exp[-i\cdot\eta_1\cdot D1(t)-i\phi]-\exp[-i\cdot\eta_2\cdot D2(t)+i\phi]\} \quad \text{(Equation 1)}$$

where $E_{IN}$ and $E_{OUT}$ represent input optical field and output optical field respectively. For example, the input optical field is the input electric field, and the output optical field is the output electric field. Additionally, $D1(t)$ and $D2(t)$ represent the electrical signals applied on the electrodes respectively, and $\eta_1$ and $\eta_2$ each are determined by at least EO coefficient and length of the corresponding electrode. Moreover, $\phi$ is related to the inherent path difference and DC bias voltages applied on the electrodes. For each electrode, the total applied voltage equals the sum of the corresponding DC bias voltage and the voltage related to the corresponding electrical signal.

Figure 5:
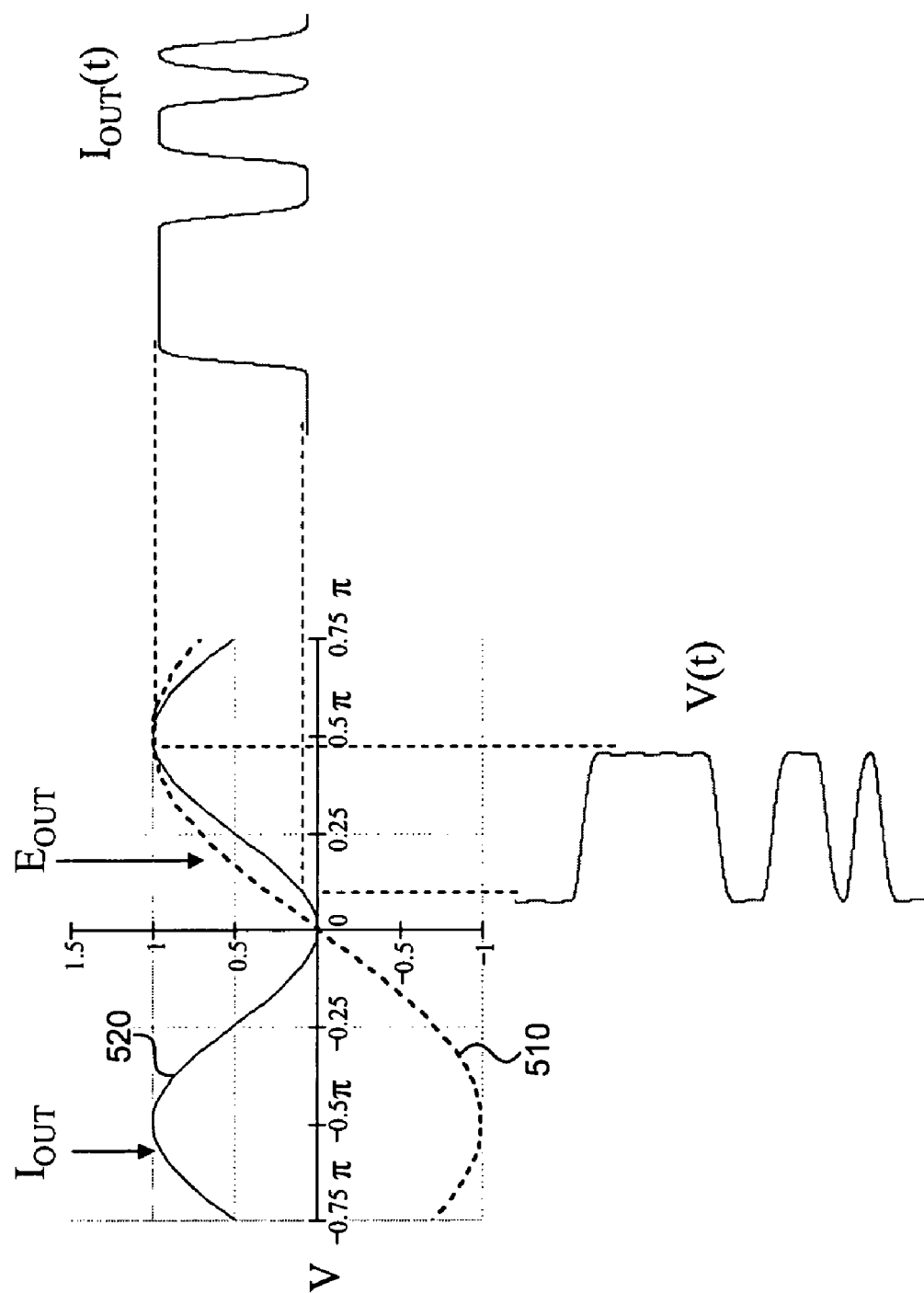
FIG. 5 is a simplified diagram showing relation between input electrical signal and output optical field and intensity for conventional single drive, "push-pull" MZ modulator, and between input electrical signal and output optical intensity in conventional NRZ modulation.

In a conventional single drive, "push-pull" MZ modulator, the electrodes often are configured so that $\eta_1=-\eta_2=\eta$. Additionally, the electrical signals are equally applied so that $D1(t)=D2(t)=D(t)$. With proper DC bias voltages, Equation 1 can be simplified as follows:

$$E_{OUT}=E_{IN}\sin[V(t)+\phi] \quad \text{(Equation 2)}$$

where $V(t)=\eta\cdot D(t)$. Thus the output optical intensity is $$I_{OUT}=I_{IN}\sin^2[V(t)+\phi] \quad \text{(Equation 3)}$$

where $I_{IN}$ and $I_{OUT}$ represent input optical intensity and output optical intensity respectively. FIG. 5 is a simplified diagram showing relation between input electrical signal and output optical field and intensity for conventional single drive, "push-pull" MZ modulator, and between input electrical signal and output optical intensity in conventional NRZ modulation. Curves 510 and 520 show the output optical field and the output optical intensity as a function of electrical signals respectively. For example, in a conventional NRZ modulation, the MZ modulator is biased by proper DC voltages such that $\phi=\pi/4$. With $\phi=\pi/4$, the electrical signals are configured to swing around a quadrature point at $\pi/4$, at which the output optical intensity is at a half of the maximum. The output optical field keeps the same sign, and the MZ modulator is used for simple intensity modulations.

Figure 6:
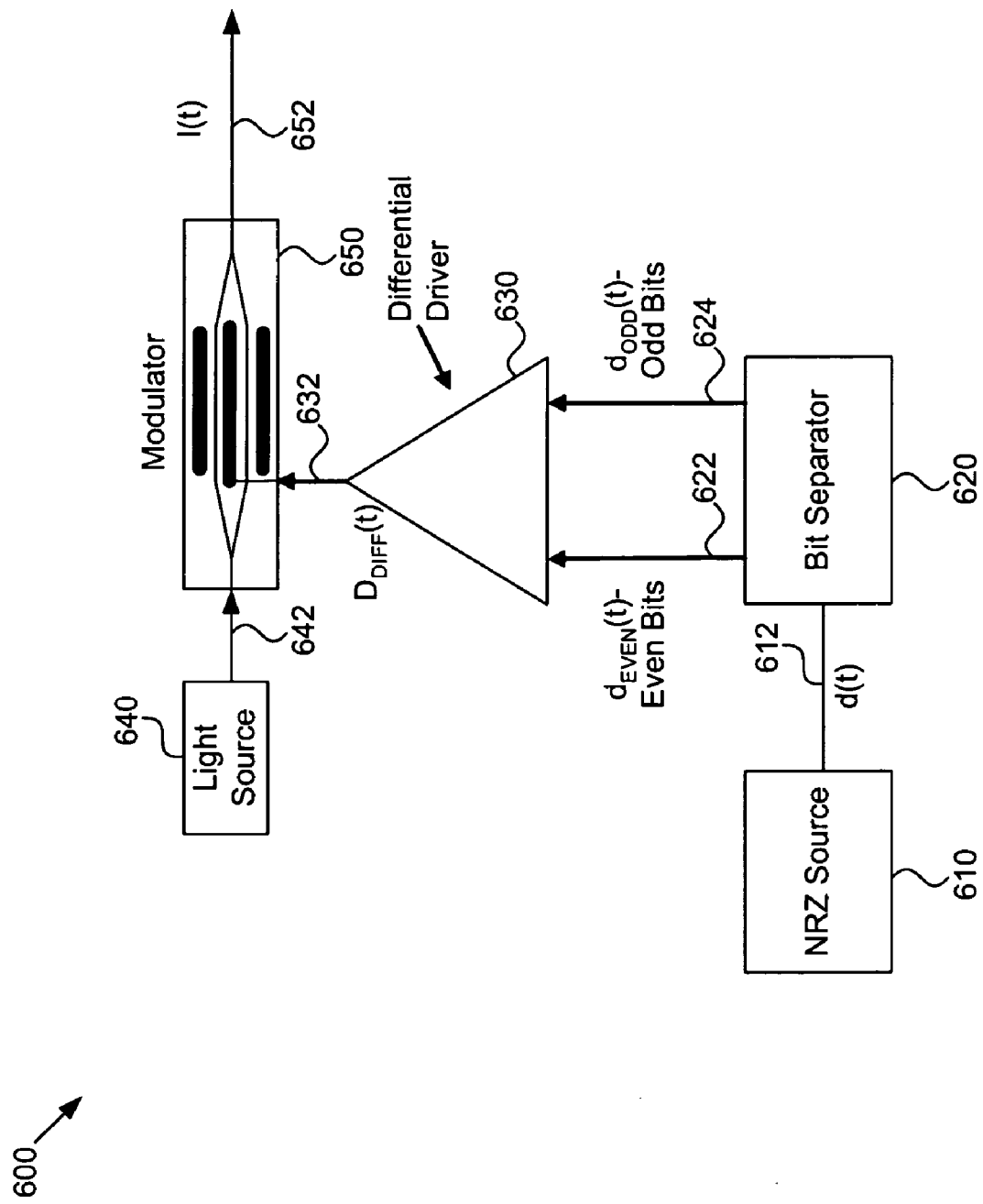
FIG. 6 is a simplified system for generating optical return-to-zero signals with alternating bi-phase shift according to an embodiment of the present invention.

FIG. 6 is a simplified system for generating optical return-to-zero signals with alternating bi-phase shift according to an embodiment of the present invention. This diagram is merely an example, which should not unduly limit the scope of the claims. One of ordinary skill in the art would recognize many variations, alternatives, and modifications. The system 600 includes an NRZ source 610, a bit separator 620, a differential driver 630, a light source 640, and a modulator 650. Although the above has been shown using a selected group of apparatuses for the system 600, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 610 provides an electrical NRZ signal 612 to the bit separator 620. For example, the NRZ signal 612 switches between a logic high level and a logic low level as a function of time. The logic high level can be represented by "1", and the logic low level can be represented by "0". In another example, the NRZ signal 612 represents data in a digital format based on the data information received from another device. In yet another example, the NRZ signal 612 is represented by d(t).

As shown in FIG. 6, the NRZ signal 612 is received by the bit separator 620. In one embodiment, the bit separator 620 separates adjacent bits in the NRZ signal 612 and generates two signals 622 and 624. The signal 622 includes bits originated from the corresponding bits in the signal 612. For example, any two of these corresponding bits are separated by at least another bit in the signal 612. Additionally, the signal 624 includes bits originated from the corresponding bits in the signal 612. For example, any two of these corresponding bits are separated by at least another bit in the signal 612. In another example, the bits in the signal 612 that correspond to the signal 622 and the bits in the signal 612 that correspond to the signal 624 do not overlap. In yet another example, every bit in the signal 612 corresponds to only one bit in either the signal 622 or the signal 624. In yet another example, the sum of the signals 622 and 624 is equal to the signal 612.

In one embodiment, the signal 612 includes even bits and odd bits, which are separated to form the signals 622 and 624 respectively. The signal 622 includes the even bits from the signal 612 and is represented by $d_{EVEN}(t)$. Additionally, the signal 624 includes the odd bits from the signal 612 and is represented by $d_{ODD}(t)$. In another embodiment, the signals 622 and 624 each are an electrical return-to-zero signal. For example, the electrical return-to-zero signal has a bit rate that is half of the bit rate of the electrical non-return-to-zero signal 612.

The differential driver 630 receives the signals 622 and 624. The difference between the signals 622 and 624 is determined and amplified. The differential driver outputs the amplified difference as a driving signal 632. For example, the driving signal 632 is an electrical signal. For example, the driving signal 632 is represented by $D_{DIFF}$. In another example, $d_{EVEN}(t)$ and $d_{ODD}(t)$ as the signals 622 and 624 are fed into the differential inputs of the differential driver 630. The gain of the differential driver is denoted as G. Accordingly, the driving signal 632 is as follows:

$$D_{DIFF}=G\cdot(d_{EVEN}-d_{ODD}) \quad \text{(Equation 4)}$$

The driving signal 632 is received by the modulator 650, which also receives a light 642 from the light source 640. For example, the light source 640 includes a CW diode laser. The light 642 is modulated by the driving signal 632 to generate an output optical signal 652. For example, the modulator 650 is a MZ modulator. In one embodiment, the MZ modulator operates according to Equations 2 and 3 with proper DC bias voltages such that $\phi=0$. For example, with $\phi=0$, the Mz modulator is referred to as being biased at null. Hence, the optical field and intensity of the output signal 652 are:

$$E_{OUT}=E_{IN}\sin\{\eta\cdot G\cdot[d_{EVEN}(t)-d_{ODD}(t)]\} \quad \text{(Equation 5)}$$

$$I_{OUT}=I_{IN}\sin^2\{\eta\cdot G\cdot[d_{EVEN}(t)-d_{ODD}(t)]\} \quad \text{(Equation 6)}$$

As shown in Equations 5 and 6, the output signal 652 is an optical CSRZ signal in one embodiment of the present invention. Additionally, the signals 612, 622, 624, and 632 each are an electrical signal according to another embodiment of the present invention.

Figure 7:
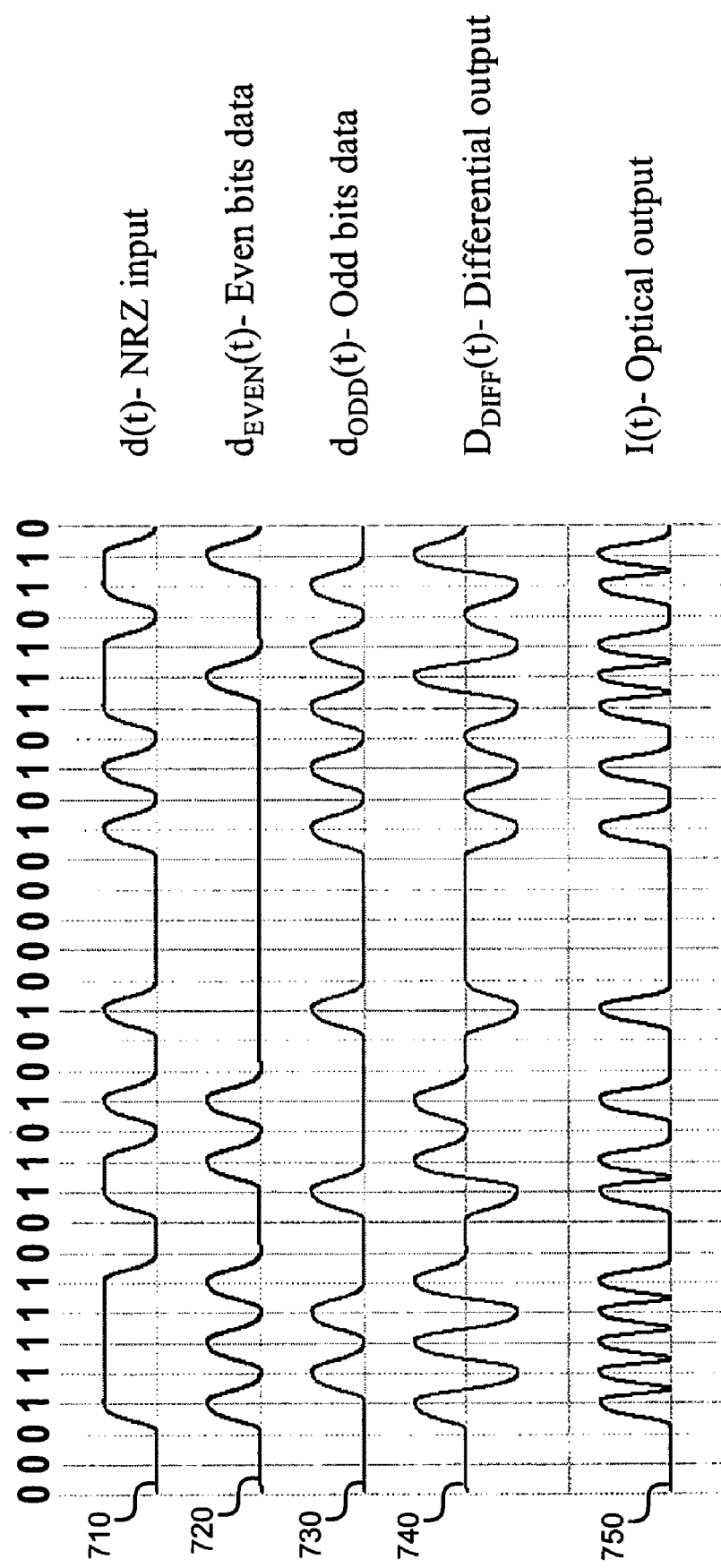
FIGS. 7 and 8 show simplified signal diagrams according to an embodiment of the present invention.
Figure 8:
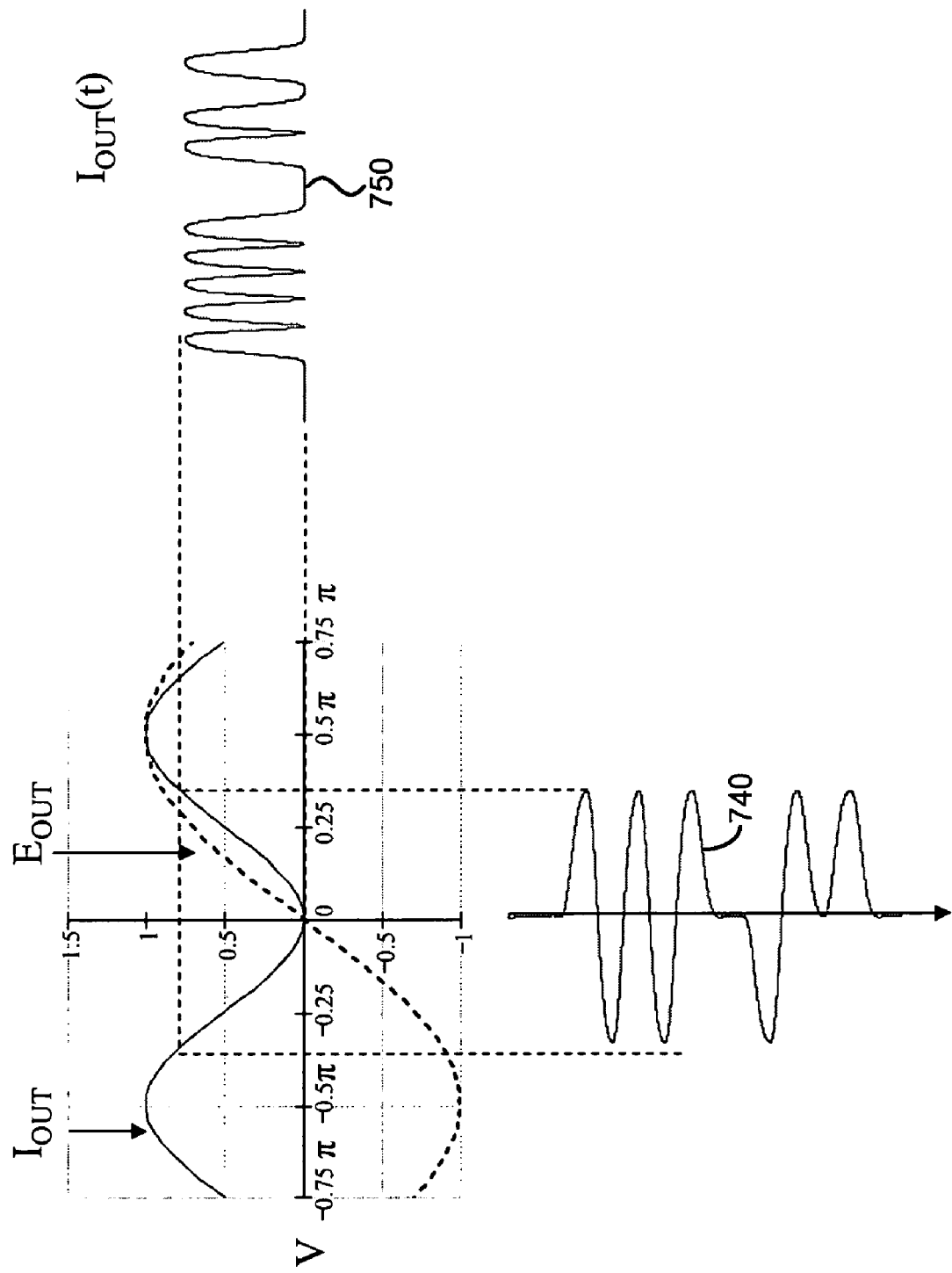

FIGS. 7 and 8 show simplified signal diagrams according to an embodiment of the present invention. These diagrams are merely examples, which should not unduly limit the scope of the claims. One of ordinary skill in the art would recognize many variations, alternatives, and modifications. For example, curves 710, 720, 730, 740, and 750 represent signals 612, 622, 624, 632, and 652 respectively. In one embodiment, the signals 612, 622, 624, and 632 are electrical signals, and the signal 652 is an optical signal. In another embodiment, the curves 710, 720, 730, and 740 each represent signal voltage as a function of time, and the curve 750 represents signal intensity as a function of time.

As shown in FIG. 7, the NRZ signal 612 includes a bit stream for 0, 0, 0, 1, 1, 1, 1, 1, 0, 0, 1, 1, 0, 1, 0, 0, 1, 0, 0, 0, 0, 0, 1, 0, 1, 0, 1, 1, 1, 0, 1, 1, and 0. These bits are separated to generate the signals 622 and 624. For example, the signal 622 includes even bits in the signal 612, which are 0, 1, 1, 1, 0, 1, 1, 0, 0, 0, 0, 0, 0, 1, 0, and 1 as shown by the curve 720. In another example, the signal 624 includes odd bits in the signal 612, which are 0, 0, 1, 1, 0, 1, 0, 0, 1, 0, 0, 1, 1, 1, 1, 1, and 0 as shown by the curve 730.

The difference between the signals 622 and 624 is determined by the differential driver 630, as shown by the curve 740. The differential driver 630 amplifies the difference and outputs the driving signal 632 to the modulator 650. In response, the modulator 650 generates the output optical signal 652, whose intensity is shown as the curve 750. The output signal 652 is in the CSRZ format.

As shown in FIGS. 7 and 8, the input NRZ data signal 612 is separated into even bit and odd bit sequences according to an embodiment of the present invention. The even bit sequence is used to generate the signal 622, and the odd bit sequence is used to generate the signal 624. The difference between the signals 622 and 624 are determined and amplified to generate the driving signal 632. The driving signal 632 includes even bits and odd bits. For even bits, the driving signal 632 provides V(t) that swings between 0 and $\pi/2$, and for odd bits, the driving signal 632 provides V(t) that swings between 0 and $-\pi/2$. Consequently, the optical field of the output signal 652 is positive for the even logic-high bits and negative for the odd logic-high bits. Additionally, during the transition times, the rising and falling edges of the two signals 622 and 624 cancel each other, resulting effectively a "return-to-zero" format. For the signal 632, the even logic-high bits and the odd logic-high bits have positive and negative signs, or 0 and $\pi$ phases, so the optical output signal 632 effectively has a CSRZ format.

Figure 9:
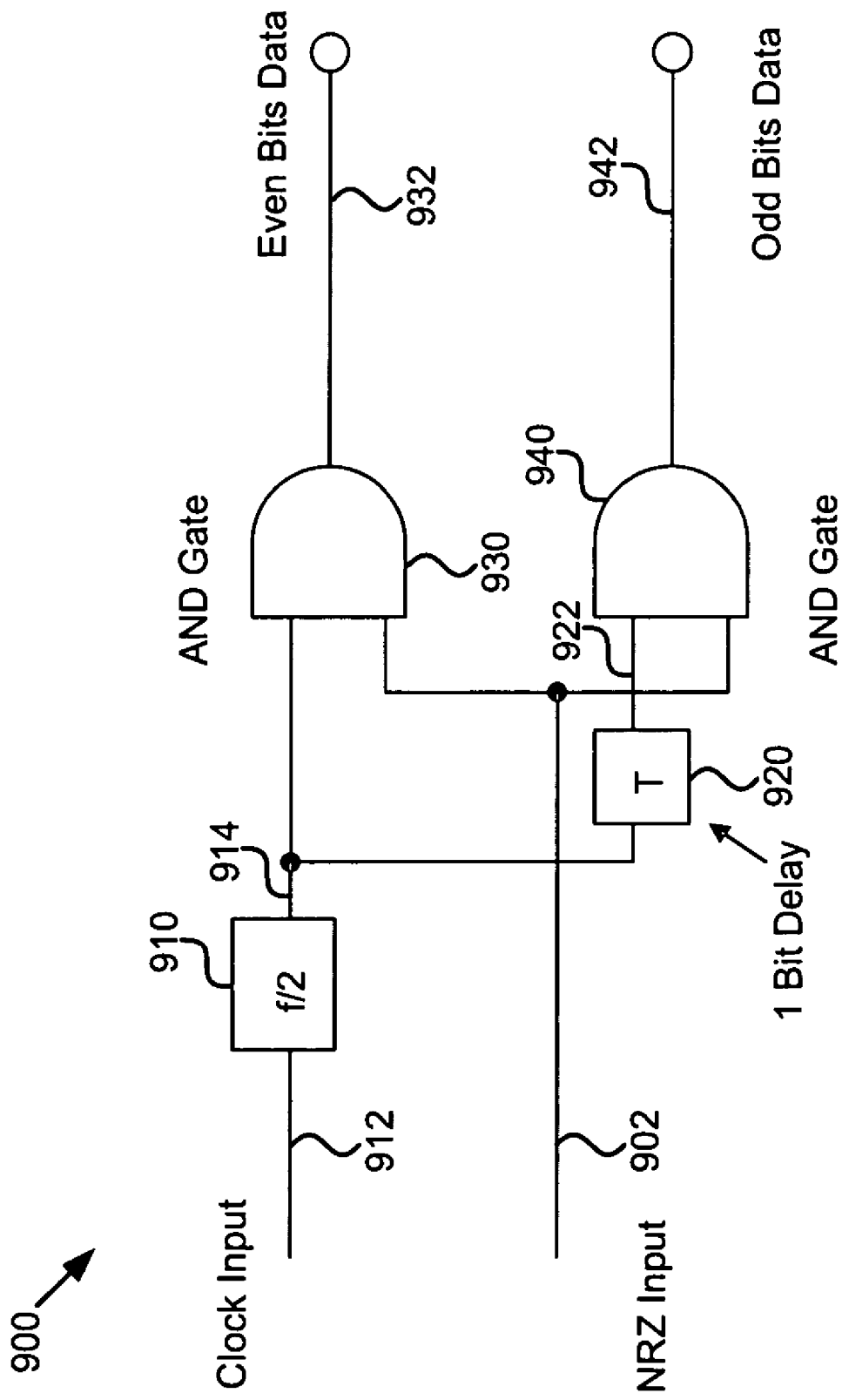
FIG. 9 is a simplified bit separator according to an embodiment of the present invention.

FIG. 9 is a simplified bit separator according to an embodiment of the present invention. This diagram is merely an example, which should not unduly limit the scope of the claims. One of ordinary skill in the art would recognize many variations, alternatives, and modifications. The bit separator 900 includes a frequency converter 910, a time delay device 920, and AND gates 930 and 940. Although the above has been shown using a selected group of apparatuses for the bit separator 900, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. For example, the bit separator 900 is the bit separator 620. Further details of these apparatuses are found throughout the present specification and more particularly below.

The frequency converter 910 receives an input clock signal 912 and generates an output clock signal 914. For example, the input clock signal 912 has a frequency f, and the output clock signal 914 has a frequency f/m. m is a positive integer. For example, m is equal to 2. The output clock signal 914 is received by the time delay device 920 and the AND gate 930. In response, the time delay device 920 generates an output clock signal 922. The clock signal 922 is delayed by n bits in comparison with the clock signal 914. For example, n is a positive odd integer. In another example, n is equal to 1. The clock signal 922 is received by the AND gate 940. The AND gates 940 and 930 each also receive an NRZ signal 902. For example, the NRZ signal 902 is the NRZ signal 612. In another example, the NRZ signal 902 is synchronized with the input clock signal 912. In yet another example, the frequency f of the input clock signal 912 corresponds to a clock period that is equal to the time period for each bit slot in the signal 902.

In one embodiment, the clock signal 914 includes a logic sequence of "10101010 . . . ". The AND gate 930 performs an AND logic function between the clock signal 914 and the NRZ signal 902 to generate an output signal 932. The output signal 932 includes even bits of the NRZ signal 902. For example, the output signal 932 is the signal 622. In another embodiment, the clock signal 922 includes a logic sequence of "01010101 . . . ", which is delayed by 1 bit in comparison with the clock signal 914. The AND gate 940 performs an AND logic function between the clock signal 922 and the NRZ signal 902 to generate an output signal 942. The output signal 942 includes odd bits of the NRZ signal 902. For example, the output signal 942 is the signal 624.

As discussed above and further emphasized here, FIG. 9 is merely an example, which should not unduly limit the scope of the claims. One of ordinary skill in the art would recognize many variations, alternatives, and modifications. For example, the input clock signal 912 has a frequency that corresponds to a clock period equal to twice of the time period for each bit slot in the signal 902. Additionally, the input clock signal 912 is synchronized with the signal 902. The frequency converter 910 is removed, and the signal 912 is received by the AND gate 930 and the time delay device 920.

Figure 10:
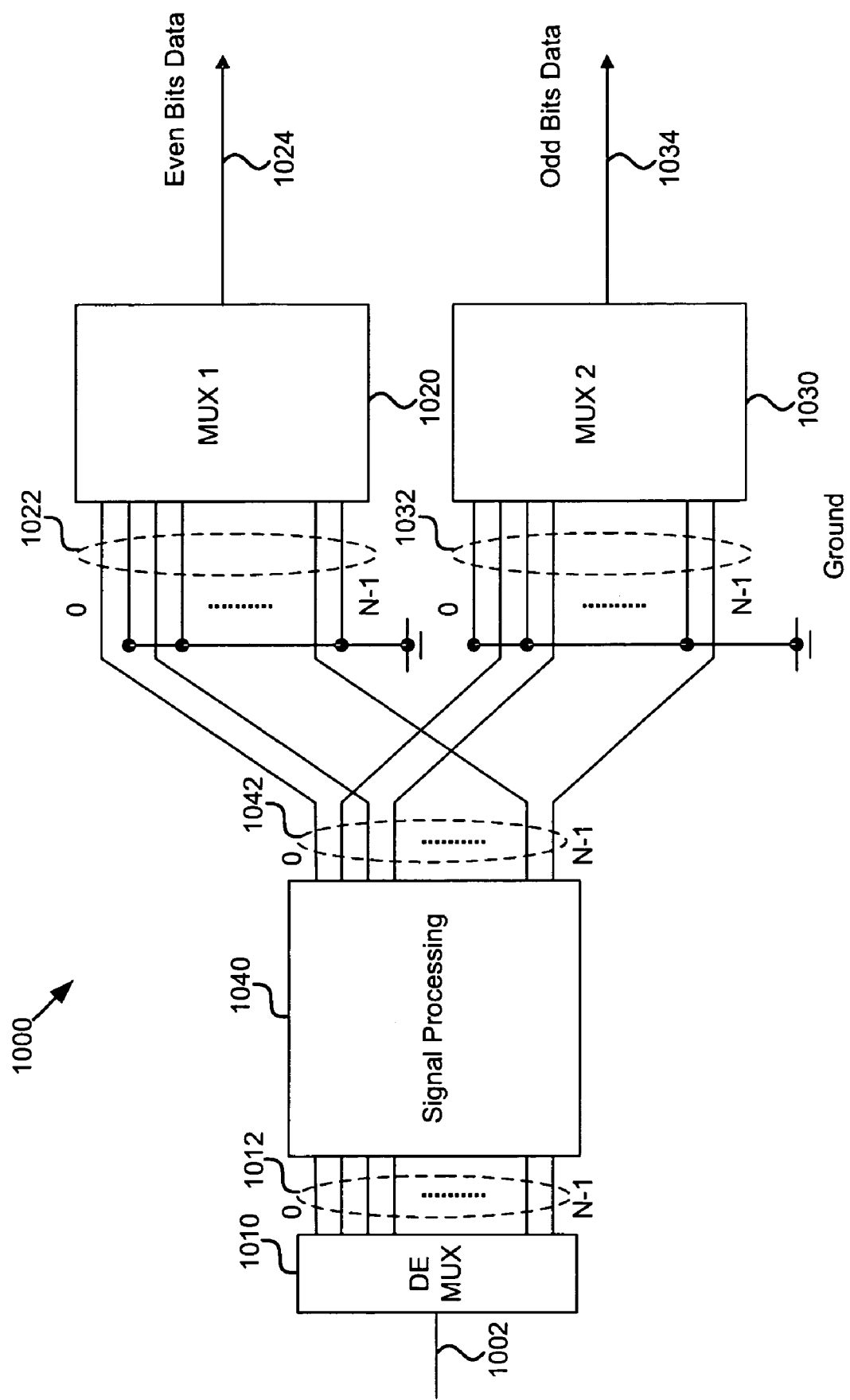
FIG. 10 is a simplified bit separator according to another embodiment of the present invention.

FIG. 10 is a simplified bit separator according to another embodiment of the present invention. This diagram is merely an example, which should not unduly limit the scope of the claims. One of ordinary skill in the art would recognize many variations, alternatives, and modifications. The bit separator 1000 includes a demultiplexer 1010, multiplexers 1020 and 1030, and a signal processing system 1040. Although the above has been shown using a selected group of apparatuses for the bit separator 1000, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. For example, the bit separator 1000 is the bit separator 620. Further details of these apparatuses are found throughout the present specification and more particularly below.

The demultiplexer 1010 receives an NRZ signal 1002, and demultiplexes the NRZ signal 1002 into a plurality of output signals 1012. For example, the demultiplexer 1010 is a serial-to-parallel demultiplexer. In another example, the NRZ signal 1002 is the NRZ signal 612. The plurality of output signals 1012 includes N output signals. N is an integer larger than 1. For example, the N output signals includes signal 1012_0, signal 1012_1, . . . signal 1012_n, . . . , and signal 1012_N−1. n is an integer equal to or larger than 0, and smaller than N. In another example, the NRZ signal 1002 corresponds to a clock frequency f, and each of the output signals 1012 corresponds to a clock frequency f/N. In yet another example, the NRZ signal 1002 includes at least an N-bit sequence, and the N-bit sequence includes bit 0, bit 1, . . . bit n . . . , and bit N−1. As shown in FIG. 10, bit 0 is demultiplexed into signal 1012_0, bit 1 is demultiplexed into signal 1012_1, . . . , bit n is demultiplexed into signal 1012_n, . . . , and bit N−1 is demultiplexed into signal 1012_N−1.

In one embodiment, the plurality of signals 1012 is received by the signal processing system 1040. For example, the signal processing system 1040 includes a SONET framer.

In another example, the signal processing system 1040 includes a forward error correction (FEC) encoder. The signal processing system 1040 processes the plurality of signals 1012 and outputs a plurality of signals 1042. The plurality of signals 1042 includes N signals. For example, the N signals include signal 1042_0, signal 1042_1, ... signal 1042_n, ... and signal 1042_N−1. Signal 1042_0 corresponds to signal 1012_0, signal 1042_1 corresponds to signal 1012_1, ..., signal 1042_n corresponds to signal 1012_n, ..., and signal 1042_N−1 corresponds to signal 1012_N−1.

The plurality of signals 1042 are received by the multiplexers 1020 and 1030. For example, each of the multiplexers 1020 and 1030 is a parallel-to-serial multiplexer. The multiplexer 1020 includes a plurality of input terminals 1022. For example, the plurality of input terminals 1022 includes terminal 1022_0, terminal 1022_1, ..., terminal 1022_n, and terminal 1022_N−1. Additionally, the multiplexer 1030 includes a plurality of input terminals 1032. For example, the plurality of input terminals 1032 includes terminal 1032_0, terminal 1032_1, ..., terminal 1032_n, ..., and terminal 1032_N−1.

If terminal 1022_0, terminal 1022_1, ..., terminal 1022_n, ..., and terminal 1022_N−1 receive signal 1042_0, signal 1042_1, ... signal 1042_n, ..., and signal 1042_N−1 respectively, the multiplexer 1020 can output a signal same as the NRZ signal 1002 if the signal processing is not performed by the system 1040. Additionally, if terminal 1032_0, terminal 1032_1, ..., terminal 1032_n, ..., and terminal 1032_N−1 receive signal 1042_0, signal 1042_1, ... signal 1042_n, ..., and signal 1042_N−1 respectively, the multiplexer 1030 can output a signal same as the NRZ signal 1002 if the signal processing is not performed by the system 1040.

For the plurality of terminals 1022, the odd-number terminals are biased to a predetermined voltage. For example, the predetermined voltage corresponds to a logic low level. In another example, each of the odd-number terminals is represented by terminal 1022_2q+1. q is an integer equal to or larger than 0, and 2q+1 is an odd integer larger than 0, and equal to or smaller than N−1. Additionally, for the plurality of terminals 1022, the even-number terminals receive respectively even-number signals among the plurality of signals 1042. For example, terminal 1022_2p receives the signal 1042_2p. p is an integer equal to or larger than 0, and 2p is an even integer equal to or larger than 0, and equal to or smaller than N−1. In response, the multiplexer 1020 generates an output signal 1024. For example, the output signal 1024 corresponds to the same clock frequency f as the NRZ signal 1002. In another example, the output signal 1024 includes the bits received from the even-number signals among the plurality of signals 1042. These bits received from the even-number signals correspond to the even bits of the NRZ signal 1002 respectively. In yet another example, the output signal 1024 is the signal 622.

For the plurality of terminals 1032, the even-number terminals are biased to the predetermined voltage. As an example, each of the even-number terminals is represented by terminal 1032_2p. p is an integer equal to or larger than 0, and 2p is an even integer equal to or larger than 0, and equal to or smaller than N−1. Additionally, for the plurality of terminals 1032, the odd-number terminals receive respectively odd-number signals among the plurality of signals 1042. For example, terminal 1023_2q+1 receives the signal 1042_2q+1. q is an integer equal to or larger than 0, and 2q+1 is an odd integer larger than 0, and equal to or smaller than N−1. In response, the multiplexer 1030 generates an output signal 1034. For example, the output signal 1034 corresponds to the same clock frequency f as the NRZ signal 1002. In another example, the output signal 1034 includes the bits received from the odd-number signals among the plurality of signals 1042. These bits received from the odd-number signals correspond to the odd bits of the NRZ signal 1002 respectively. In yet another example, the output signal 1034 is the signal 624.

As discussed above and further emphasized here, FIG. 10 is merely an example, which should not unduly limit the scope of the claims. One of ordinary skill in the art would recognize many variations, alternatives, and modifications. For example, the signal processing system 1040 is removed. The plurality of signals 1012 is directly received by the multiplexers 1020 and 1030 as the plurality of signals 1042.

Figure 11:
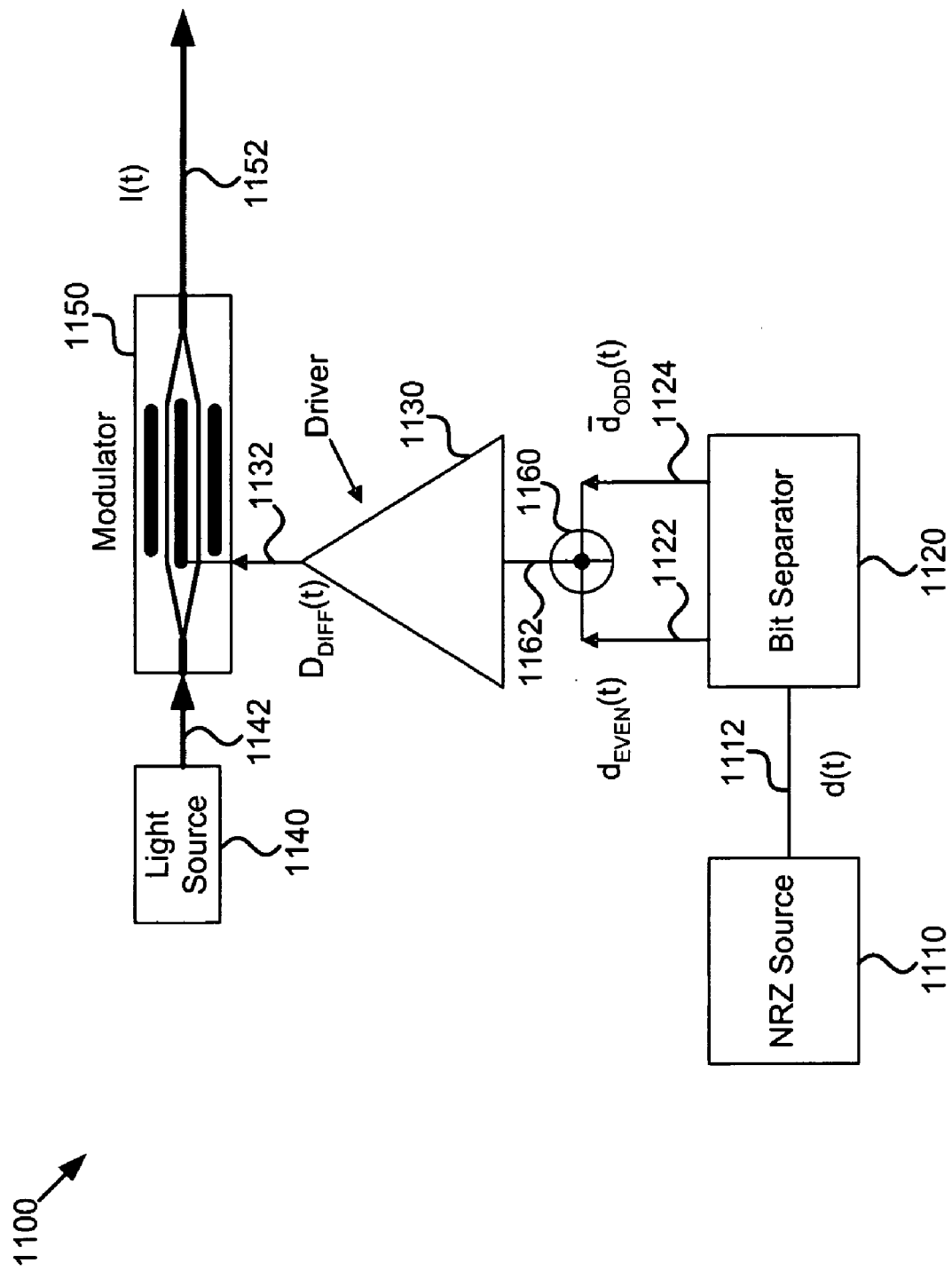
FIG. 11 is a simplified system for generating optical return-to-zero signals with alternating bi-phase shift according to another embodiment of the present invention.

FIG. 11 is a simplified system for generating optical return-to-zero signals with alternating bi-phase shift according to another embodiment of the present invention. This diagram is merely an example, which should not unduly limit the scope of the claims. One of ordinary skill in the art would recognize many variations, alternatives, and modifications. The system 1100 includes an NRZ source 1110, a bit separator 1120, a driver 1130, a light source 1140, a modulator 1150, and a combiner 1160. Although the above has been shown using a selected group of apparatuses for the system 1100, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 1110 provides an electrical NRZ signal 1112 to the bit separator 1120. For example, the NRZ signal 1112 switches between a logic high level and a logic low level as a function of time. The logic high level can be represented by "1", and the logic low level can be represented by "0". In another example, the NRZ signal 1112 represents data in a digital format based on the data information received from another device. In yet another example, the NRZ signal 1112 is represented by d(t).

As shown in FIG. 11, the NRZ signal 1112 is received by the bit separator 1120. For example, the bit separator 1120 is the bit separator 900 with certain modifications. In anther example, the bit separator 1120 is the bit separator 1000 with some modifications. In one embodiment, the bit separator 1120 separates adjacent bits in the NRZ signal 1112 and generates two signals 1122 and 1124. The signal 1122 includes bits originated from the corresponding bits in the signal 1112. For example, any two of these corresponding bits are separated by at least another bit in the signal 1112. Additionally, the signal 1124 includes bits originated from the corresponding bits in the signal 1112. For example, any two of these corresponding bits are separated by at least another bit in the signal 1112. In another example, the bits in the signal 1112 that correspond to the signal 1122 and the bits in the signal 1112 that correspond to the signal 1124 do not overlap. In yet another example, every bit in the signal 1112 corresponds to only one bit in either the signal 1122 or the signal 1124.

In one embodiment, the signal 1112 includes even bits and odd bits, which are separated to form the signals 1122 and 1124 respectively. For example, the signal 1122 includes the even bits from the signal 1112 and is represented by $d_{EVEN}(t)$. Additionally, the signal 1124 includes the odd bits from the signal 1112 multiplied by −1 in signal strength and is represented by $\bar{d}_{ODD}(t)$. For example, if an odd bit in the signal 1112 is represented by a positive voltage, the corresponding bit in the signal 1124 is represented by a negative voltage. In another example, the signal 1122 includes the even bits from the signal 1112 multiplied by −1 in signal strength and is represented by $\bar{d}_{EVEN}(t)$. Additionally, the signal 1124 includes the odd bits from the signal 1112, and is represented by $d_{ODD}(t)$. For example, if an even bit in the signal 1112 is represented by a positive voltage, the corresponding bit in the signal 1122 is represented by a negative voltage.

The combiner 1160 receives the signals 1122 and 1124. The sum of the signals 1122 and 1124 is determined and outputted as a signal 1162 to the driver 1130. The driver 1130 amplifies the signal 1162 and generates a driving signal 1132. For example, the driving signal 1132 is represented by $D_{DIFF}$. In another example, $d_{EVEN}(t)$ and $\bar{d}_{ODD}(t)$ as the signals 1122 and 1124 are fed into the combiner 1160. The gain of the driver is denoted as G. Accordingly, the driving signal 1132 is determined according to Equation 4.

The driving signal 1132 is received by the modulator 1150, which also receives a light 1142 from the light source 1140. For example, the light source 1140 includes a CW diode laser. The light 1142 is modulated by the driving signal 1132 to generate an output optical signal 1152. For example, the modulator 1150 is a Mz modulator. In one embodiment, the Mz modulator operates according to Equations 2 and 3 with proper DC bias voltages. Hence, the optical field and intensity of the output signal 1152 are determined according to Equations 5 and 6 respectively. As shown in Equations 5 and 6, the output signal 1152 is a CSRZ signal in one embodiment of the present invention. Additionally, the signals 1112, 1122, 1124, 1132, and 1162 each are an electrical signal according to another embodiment of the present invention.

In a conventional dual drive MZ modulator, the electrodes often are configured so that $\eta_1=\eta_2=\eta$. Additionally, the MZ modulator can be biased with proper DC voltages such that $\phi=0$. For example, with $\phi=0$, the MZ modulator is referred to as being biased at null. Hence Equation 1 can be simplified as follows:

$$E_{OUT}=E_{IN}\cdot\sin\{[V1(t)-V2(t)]\cdot 0.5\}\cdot\exp\{-i\cdot[V1(t)+V2(t)]\cdot 0.5\}$$ (Equation 7)

where $V1(t)=\eta\cdot D1(t)$ (Equation 8A)

and $V2(t)=\eta\cdot D2(t)$ (Equation 8B)

In a "push-pull" configuration, $D1(t)=-D2(t)=D(t)$. Then Equation 7 becomes the same as Equation 2. Additionally, the output optical intensity is described by Equation 3.

Figure 12:
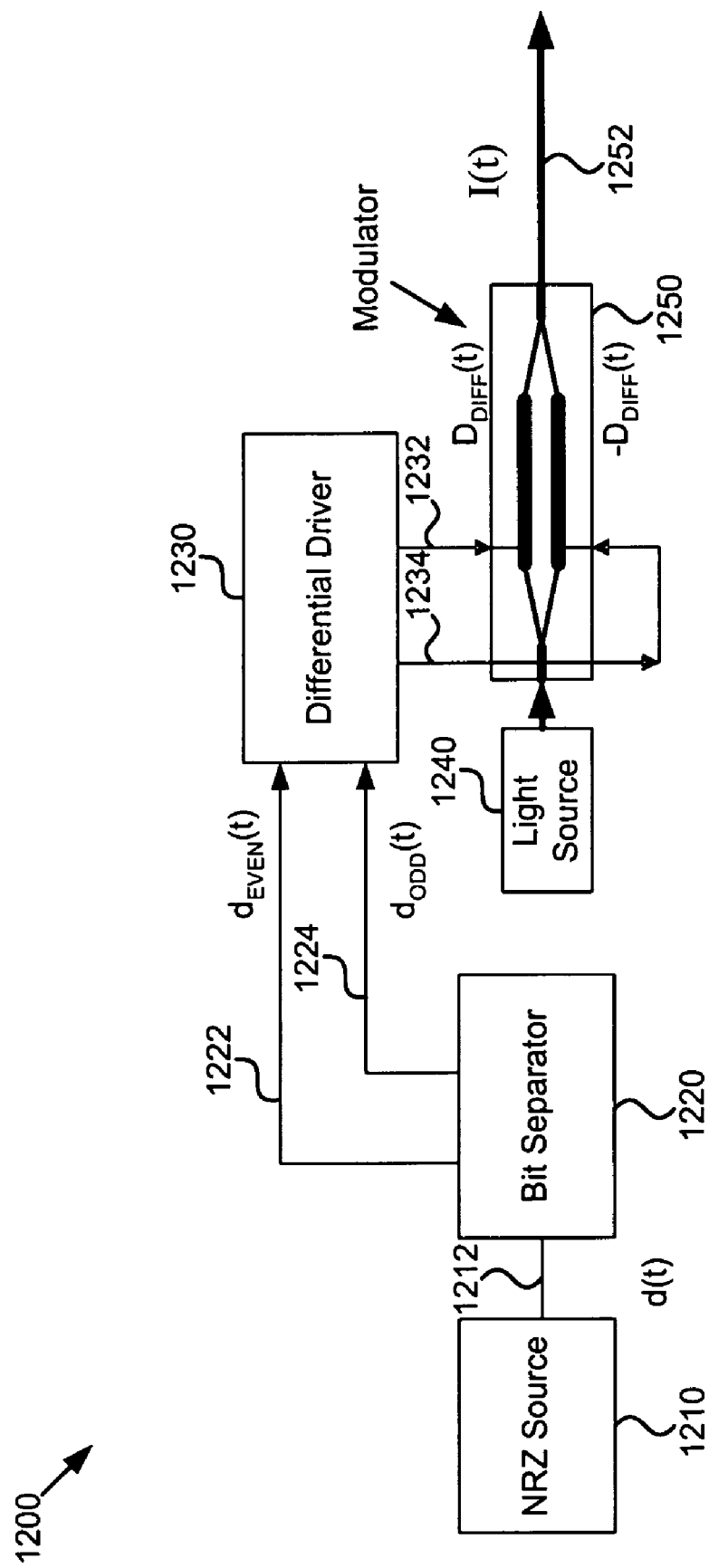
FIG. 12 is a simplified system for generating optical return-to-zero signals with alternating bi-phase shift according to yet another embodiment of the present invention.

FIG. 12 is a simplified system for generating optical return-to-zero signals with alternating bi-phase shift according to yet another embodiment of the present invention. This diagram is merely an example, which should not unduly limit the scope of the claims. One of ordinary skill in the art would recognize many variations, alternatives, and modifications. The system 1200 includes an NRZ source 1210, a bit separator 1220, a differential driver 1230, a light source 1240, and a modulator 1250. Although the above has been shown using a selected group of apparatuses for the system 1200, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 1210 provides an electrical NRZ signal 1212 to the bit separator 1220. For example, the NRZ signal 1212 switches between a logic high level and a logic low level as a function of time. The logic high level can be represented by "1", and the logic low level can be represented by "0". In another example, the NRZ signal 1212 represents data in a digital format based on the data information received from another device. In yet another example, the NRZ signal 1212 is represented by d(t).

As shown in FIG. 12, the NRZ signal 1212 is received by the bit separator 1220. For example, the bit separator 1220 is the bit separator 900. In anther example, the bit separator 1220 is the bit separator 1000. In one embodiment, the bit separator 1220 separates adjacent bits in the NRZ signal 1212 and generates two signals 1222 and 1224. The signal 1222 includes bits originated from the corresponding bits in the signal 1212. For example, any two of these corresponding bits are separated by at least another bit in the signal 1212. Additionally, the signal 1224 includes bits originated from the corresponding bits in the signal 1212. For example, any two of these corresponding bits are separated by at least another bit in the signal 1212. In another example, the bits in the signal 1212 that correspond to the signal 1222 and the bits in the signal 1212 that correspond to the signal 1224 do not overlap. In yet another example, every bit in the signal 1212 corresponds to only one bit in either the signal 1222 or the signal 1224. In yet another example, the sum of the signals 1222 and 1224 is equal to the signal 1212.

In one embodiment, the signal 1212 includes even bits and odd bits, which are separated to form the signals 1222 and 1224 respectively. The signal 1222 includes the even bits from the signal 1212 and is represented by $d_{EVEN}(t)$. Additionally, the signal 1224 includes the odd bits from the signal 1212, and is represented by $d_{ODD}(t)$. In another embodiment, the signals 1222 and 1224 each are an electrical return-to-zero signal. For example, the electrical return-to-zero signal has a bit rate that is half of the bit rate of the electrical non-return-to-zero signal 1212.

The differential driver 1230 receives the signals 1222 and 1224. The difference between the signals 622 and 624 is determined and amplified. The differential driver outputs the amplified difference as driving signal 1232 and 1234. For example, the driving signals 1232 and 1234 are represented by $D_{DIFF}$ and $\bar{D}_{DIFF}$ respectively. In another example, $d_{EVEN}(t)$ and $d_{ODD}(t)$ as the signals 1222 and 1224 are fed into the differential inputs of the differential driver 1230. The gain of the differential driver is denoted as G. Accordingly, the driving signals 1232 and 1234 are as follows:

$$D_{DIFF}=G\cdot(d_{EVEN}-d_{ODD})$$ (Equation 9A)

$$\bar{D}_{DIFF}=G\cdot(d_{ODD}-d_{EVEN})=-D_{DIFF}$$ (Equation 9B)

The driving signals 1232 and 1234 are received by the modulator 1250, which also receives a light 1242 from the light source 1240. For example, the light source 1240 includes a CW diode laser. The light 1242 is modulated by the driving signal 1232 and 1234 to generate an output optical signal 1252. For example, the modulator 1250 is a Mz modulator. Referring to Equations 7, 8A, and 8B, $D1(t)=D_{DIFF}(t)$ and $D2(t)=-D_{DIFF}(t)$. In one embodiment, the Mz modulator operates according to Equations 2 and 3 with proper DC bias voltages. Hence, the optical field and intensity of the output signal 1252 are determined according to Equations 5 and 6. As shown in Equations 5 and 6, the output signal 1252 is a CSRZ signal in one embodiment of the present invention. Additionally, the signals 1212, 1222, 1224, 1232, and 1234 each are an electrical signal according to another embodiment of the present invention.

Figure 13:
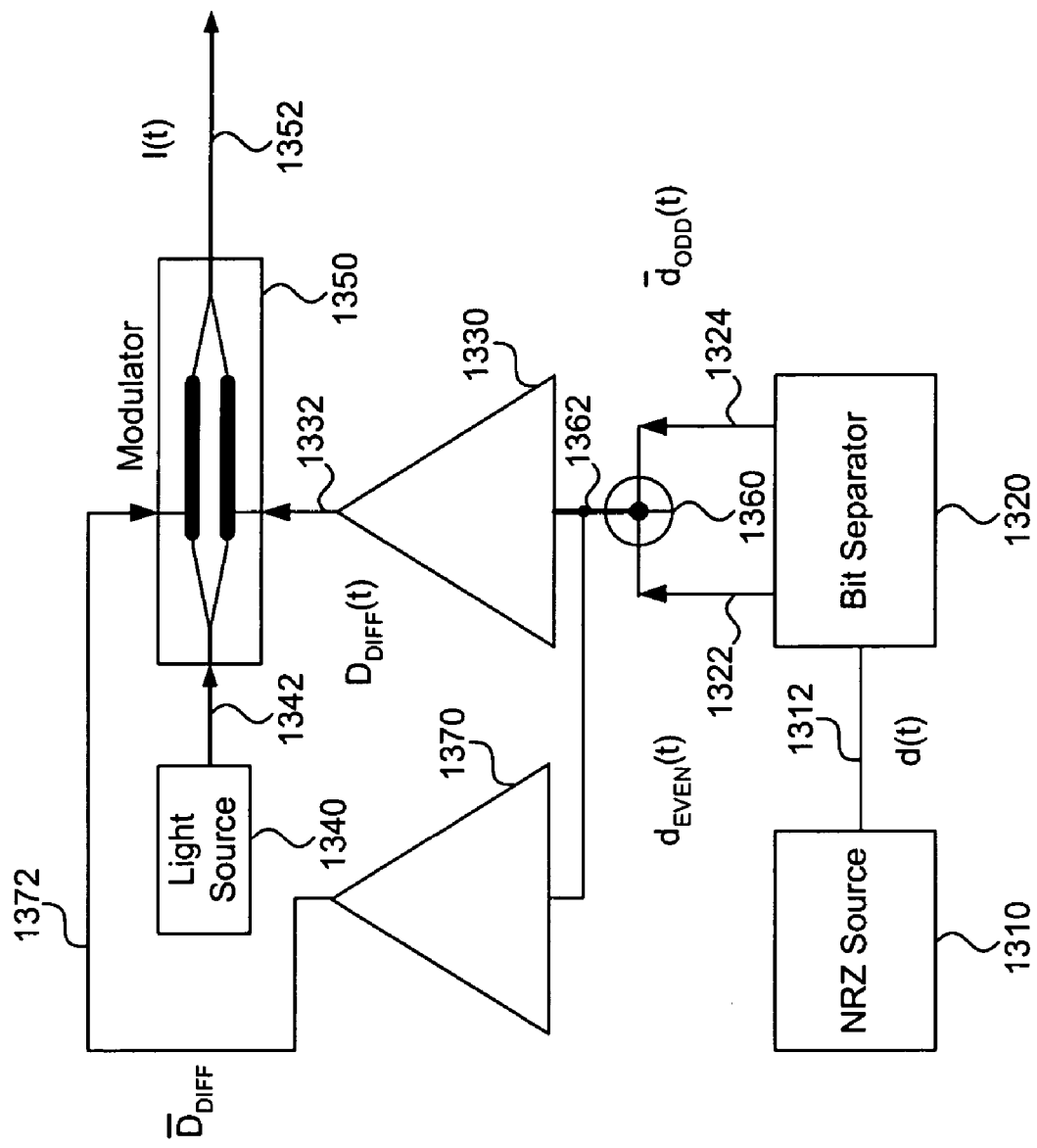
FIG. 13 is a simplified system for generating optical return-to-zero signals with alternating bi-phase shift according to yet another embodiment of the present invention.

FIG. 13 is a simplified system for generating optical return-to-zero signals with alternating bi-phase shift according to yet another embodiment of the present invention. This diagram is merely an example, which should not unduly limit the scope of the claims. One of ordinary skill in the art would recognize many variations, alternatives, and modifications. The system 1300 includes an NRZ source 1310, a bit separator 1320, drivers 1330 and 1370, a light source 1340, a modulator 1350, and a combiner 1360. Although the above has been shown using a selected group of apparatuses for the system 1300, there can be many alternatives, modifications, and variations. For example, some of the apparatuses may be expanded and/or combined. Other apparatuses may be inserted to those noted above. Depending upon the embodiment, the arrangement of apparatuses may be interchanged with others replaced. Further details of these apparatuses are found throughout the present specification and more particularly below.

The NRZ source 1310 provides an NRZ signal 1312 to the bit separator 1320. For example, the NRZ signal 1312 switches between a logic high level and a logic low level as a function of time. The logic high level can be represented by "1", and the logic low level can be represented by "0". In another example, the NRZ signal 1312 represents data in a digital format based on the data information received from another device. In yet another example, the NRZ signal 1312 is represented by d(t).

As shown in FIG. 13, the NRZ signal 1312 is received by the bit separator 1320. For example, the bit separator 1320 is the bit separator 900 with certain modifications. In anther example, the bit separator 1320 is the bit separator 1000 with some modifications. In one embodiment, the bit separator 1320 separates adjacent bits in the NRZ signal 1312 and generates two signals 1322 and 1324. The signal 1322 includes bits originated from the corresponding bits in the signal 1312. For example, any two of these corresponding bits are separated by at least another bit in the signal 1312. Additionally, the signal 1324 includes bits originated from the corresponding bits in the signal 1312. For example, any two of these corresponding bits are separated by at least another bit in the signal 1312. In another example, the bits in the signal 1312 that correspond to the signal 1322 and the bits in the signal 1312 that correspond to the signal 1324 do not overlap. In yet another example, every bit in the signal 1312 corresponds to only one bit in either the signal 1322 or the signal 1324.

In one embodiment, the signal 1312 includes even bits and odd bits, which are separated to form the signals 1322 and 1324 respectively. For example, the signal 1322 includes the even bits from the signal 1312 and is represented by $d_{EVEN}(t)$. Additionally, the signal 1324 includes the odd bits from the signal 1312 multiplied by −1 and is represented by $\bar{d}_{ODD}(t)$. For example, if an odd bit in the signal 1312 is represented by a positive voltage, the corresponding bit in the signal 1324 is represented by a negative voltage. In another example, the signal 1322 includes the even bits from the signal 1312 multiplied by −1 and is represented by $\bar{d}_{EVEN}(t)$. Additionally, the signal 1324 includes the odd bits from the signal 1312 and is represented by $d_{ODD}(t)$. For example, if an even bit in the signal 1312 is represented by a positive voltage, the corresponding bit in the signal 1322 is represented by a negative voltage.

The combiner 1360 receives the signals 1322 and 1324. The sum of the signals 1322 and 1324 is determined and outputted as a signal 1362 to the drivers 1330 and 1370. The driver 1330 amplifies the signal 1362 and generates a driving signal 1332, and the driver 1370 amplifies the signal 1362 and generates a driving signal 1372. For example, $d_{EVEN}(t)$ and $\bar{d}_{ODD}(t)$ as the signals 1322 and 1324 are fed into the combiner 1360. The gains of the drivers 1330 and 1370 each are equal to G, and the driver 1370 is an inverse amplifier. Accordingly, the driving signals 1332 and 1372 are determined by:

$$D_{DIFF} = G \cdot (d_{EVEN} - d_{ODD}) \qquad \text{(Equation 10A)}$$

$$\bar{D}_{DIFF} = -G \cdot (d_{EVEN} - d_{ODD}) = -D_{DIFF} \qquad \text{(Equation 10B)}$$

where $D_{DIFF}$ represents the driving signal 1332, and $\bar{D}_{DIFF}$ represents the driving signal 1372. The driving signals 1332 and 1372 are received by the modulator 1350, which also receives a light 1342 from the light source 1340. For example, the light source 1340 includes a CW diode laser. The light 1342 is modulated by the driving signal 1332 and 1372 to generate an output optical signal 1352. For example, the modulator 1350 is a Mz modulator. Referring to Equations 7, 8A, and 8B, $D1(t) = D_{DIFF}(t)$ and $D2(t) = -D_{DIFF}(t)$. In one embodiment, the MZ modulator operates according to Equations 2 and 3 with proper DC bias voltages. Hence, the optical field and intensity of the output signal 1352 are determined according to Equations 5 and 6. As shown in Equations 5 and 6, the output signal 1352 is a CSRZ signal in one embodiment of the present invention. Additionally, the signals 1312, 1322, 1324, 1332, 1362, and 1372 each are an electrical signal according to another embodiment of the present invention.

Figure 14:
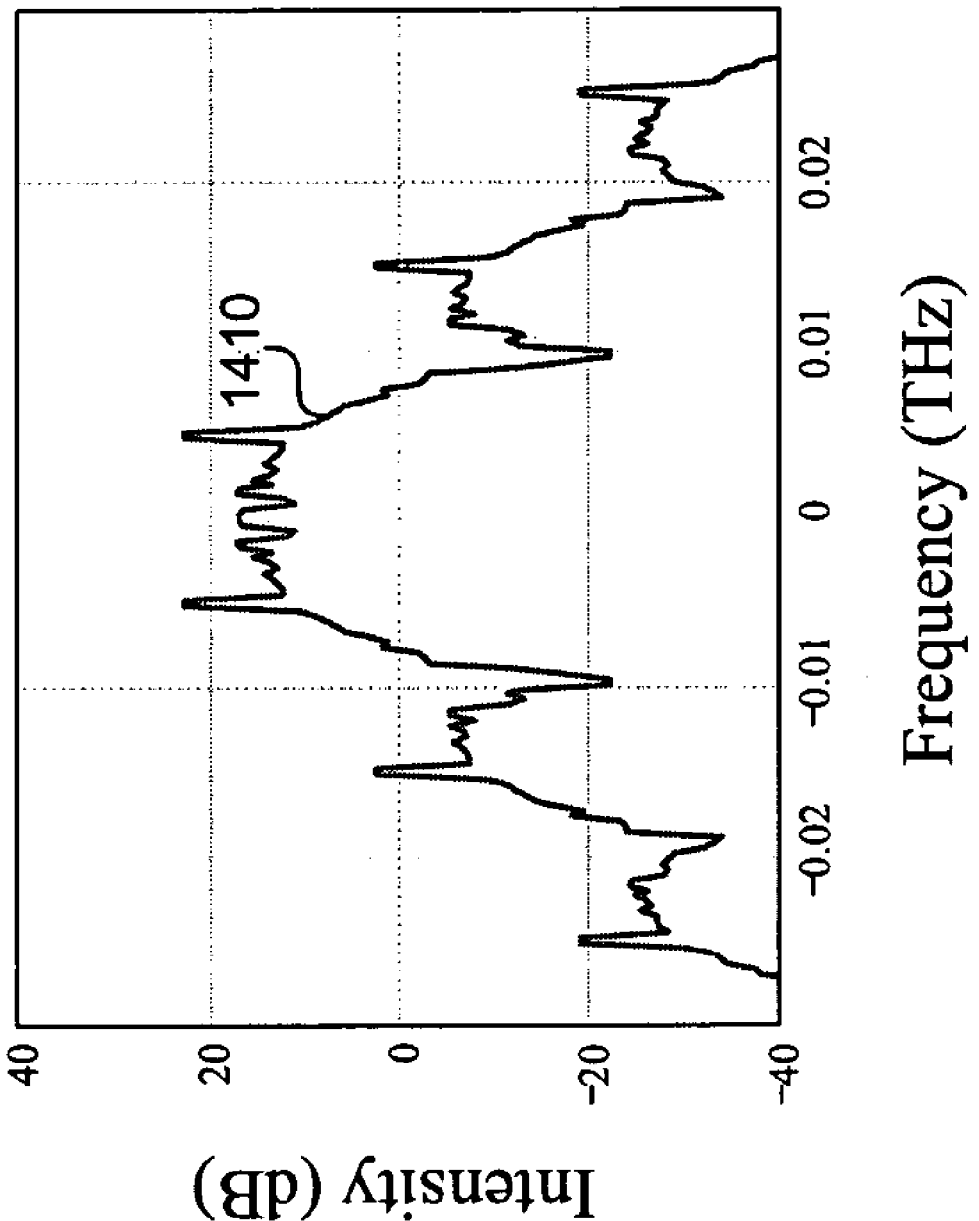
FIG. 14 is a simplified diagram showing intensity spectrum for an output signal according to an embodiment of the present invention.

FIG. 14 is a simplified diagram showing intensity spectrum for an output signal according to an embodiment of the present invention. This diagram is merely an example, which should not unduly limit the scope of the claims. One of ordinary skill in the art would recognize many variations, alternatives, and modifications. A curve 1410 represents optical intensity of an output signal as a function of frequency. For example, the output signal is the signal 652 generated by the system 600, the signal 1152 generated by the system 1100, the signal 1252 generated by the system 1200, or the signal 1352 generated by the system 1300. The curve 1410 shows the absence of peak at the carrier frequency, which is characteristic for a CSRZ signal spectrum.

As discussed above and further emphasized here, FIGS. 6-14 are merely examples, which should not unduly limit the scope of the claims. One of ordinary skill in the art would recognize many variations, alternatives, and modifications. For example, the bit separator 620, 1120, 1220, or 1320 can separate bits of the input NRZ signal in various ways. In one embodiment, the separation is not performed based on whether a bit is an even bit or an odd bit. The separated bits are included in two output signals from the bit separator. For example, the output signals each have a rate half the rate of the input NRZ signal. In another example, the input signals to the one or more drivers have identical duty cycles equal to or smaller than 50% and are synchronously interleaved. The output from the modulator 650, 1150, 1250, or 1350 can be an electro-optically time-division multiplexed (EOTDM) CSRZ signal. The EOTDM CSRZ signal has a data rate that is twice as high as the data rate for each of the input signals to the one or more drivers.

The present invention has various advantages. Some embodiments of the present invention provide systems and methods for generating optical carrier-suppressed return-to-zero (CSRZ) signals. Certain embodiments of the present invention provides systems and methods that separate an electrical non-return-to-zero (NRZ) signal into an "even bit signal" and an "odd bit signal", and then combine the two signals differentially to drive Mach-Zehnder (MZ) electro-optical (EO) modulators to generate an optical CSRZ signal. Some embodiments of the present invention provide systems and methods that use only components designed for NRZ transmitters to generate optical CSRZ signals. For example, only one MZ data modulator is used to generate the CSRZ signals. Certain embodiments of the present invention can significantly lower the cost of a transmitter for optical CSRZ signals. Some embodiments of the present invention can significantly reduce the complexity of a transmitter for optical CSRZ signals. Certain embodiments of the present invention can improve reliability of a transmitter for optical CSRZ signals. Some embodiments of the present invention can significantly improve performance of a fiber optical transport system. For example, the fiber optical transport system is used for transmission at a high data rate, such as a rate higher than 10 Gbps.

Certain embodiments of the present invention provide systems and methods that generate two half-rate electrical return-to-zero (eRZ) signals and combine these two signals differentially with a differential amplifier to drive a single drive Mach-Zehnder modulator biased at null to generate a full rate optical CSRZ signal. For example, the systems and methods are implemented according to FIG. 6. Some embodiments of the present invention provide systems and methods that generate two half-rate electrical return-to-zero (eRZ) signals and combine these two signals differentially with a differential amplifier to drive a dual drive Mach-Zehnder modulator biased at null to generate a full rate optical CSRZ signal. For example, the systems and methods are implemented according to FIG. 12.

Certain embodiments of the present invention provide systems and methods that separate an electrical non-return-to-zero (NRZ) signal into an "even bit signal" and an "odd bit signal", and then combine these two signals differentially with a differential amplifier to drive a single drive Mach-Zehnder modulator to generate an optical CSRZ signals. For example, the systems and methods are implemented according to FIG. 6. Some embodiments of the present invention provide systems and methods that separate an electrical non-return-to-zero (NRZ) signal into an "even bit signal" and an "odd bit signal", and then combine these two signals differentially with a differential amplifier to drive a dual drive Mach-Zehnder modulator to generate an optical CSRZ signals. For example, the systems and methods are implemented according to FIG. 12.

Certain embodiments of the present invention provide systems and methods that use AND gates to generate an "even bit signal" and an "odd bit signal". For example, the systems and methods are implemented according to FIG. 9. Some embodiments of the present invention provide systems and methods that use parallel-to-serial multiplexers to generate an "even bit signal" and an "odd bit signal". For example, the systems and methods are implemented according to FIG. 10.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for generating an optical return-to-zero signal, the system comprising:
a bit separator configured to receive an electrical non-return-to-zero signal and generate a first signal and a second signal;
a driver configured to receive the first signal and the second signal and generate a driving signal, the driving signal being associated with a difference between the first signal and the second signal;
a light source configured to generate a light;
an electro-optical modulator configured to receive the light and the driving signal, modulate the light with the driving signal, and generate an optical signal;
wherein:
the electrical non-return-to-zero signal includes a first plurality of bits and a second plurality of bits;
the first signal includes the first plurality of bits;
the second signal includes the second plurality of bits;
the optical signal is an optical return-to-zero signal.

2. The system of claim 1 wherein a sum of the first signal and the second signal is equal to the electrical non-return-to-zero signal.

3. The system of claim 1 wherein:
the first signal does not include the second plurality of bits;
the second signal does not include the first plurality of bits.

4. The system of claim 1 wherein for the electrical non-return-to-zero signal:
any two of the first plurality of bits are separated by at least one of the second plurality of bits;
any two of the second plurality of bits are separated by at least one of the first plurality of bits.

5. The system of claim 4 wherein for the electrical non-return-to-zero signal:
the first plurality of bits is even bits;
the second plurality of bits is odd bits.

6. The system of claim 1 wherein each of the first plurality of bits and the second plurality of bits is associated with a logic high level or a logic low level.

7. The system of claim 1 wherein:
the electrical non-return-to-zero signal is associated with an input bit rate;
the first signal is associated with a first bit rate, the first bit rate being half of the input bit rate;
the second signal is associated with a second bit rate, the second bit rate being half of the input bit rate.

8. The system of claim 1, and further comprising a non-return-to- zero source configured to provide the electrical non-return-to-zero signal.

9. The system of claim 1 wherein each of the first signal, the second signal, and the driving signal is an electrical signal.

10. The system of claim 1 wherein the driving signal is proportional to the difference between the first signal and the second signal.

11. The system of claim 1 wherein the light source is a laser.

12. The system of claim 1 wherein the electro-optical modulator is a Mach-Zehnder modulator.

13. A system for generating an optical return-to-zero signal, the system comprising:
a bit separator configured to receive an electrical non-return-to-zero signal and generate a first signal and a second signal;
a combiner configured to receive the first signal and the second signal and generate a third signal, the third signal being associated with a sum of the first signal and the second signal;
a light source configured to generate a light;
an electro-optical modulator configured to receive the light and a driving signal, modulate the light with the driving signal, and generate an optical signal;
wherein:
the electrical non-return-to-zero signal includes a first plurality of bits and a second plurality of bits;
the first signal includes the first plurality of bits;
the second signal includes a third plurality of bits, the third plurality of bits equal to the second plurality of bits multiplied by a negative number in signal strength;
the driving signal is proportional to the third signal;
the optical signal is an optical return-to-zero signal.

14. The system of claim 13, and further comprising a driver configured to receive the third signal and generate the driving signal, the driving signal being proportional to the sum of the first signal and the second signal.

15. The system of claim 13 wherein the negative number is equal to −1.

16. The system of claim 13 wherein for the electrical non-return-to-zero signal:
   any two of the first plurality of bits are separated by at least one of the second plurality of bits;
   any two of the second plurality of bits are separated by at least one of the first plurality of bits.

17. The system of claim 16 wherein for the electrical non-return-to-zero signal:
   the first plurality of bits is even bits;
   the second plurality of bits is odd bits.

18. The system of claim 13 wherein:
   the electrical non-return-to-zero signal is associated with an input bit rate;
   the first signal is associated with a first bit rate, the first bit rate being half of the input bit rate;
   the second signal is associated with a second bit rate, the second bit rate being half of the input bit rate.

19. The system of claim 13, and further comprising a non-return-to-zero source configured to provide the electrical non-return-to-zero signal.

20. The system of claim 13 wherein each of the first signal, the second signal, the third signal, and the driving signal is an electrical signal.

21. The system of claim 13 wherein the electro-optical modulator is a Mach-Zehnder modulator.

22. A system for generating an optical return-to-zero signal, the system comprising:
   a bit separator configured to receive an electrical non-return-to-zero signal and generate a first input signal and a second input signal;
   a driver configured to receive the first input signal and the second input signal and generate a first driving signal and a second driving signal, each of the first driving signal and the second driving being associated with a difference between the first input signal and the second input signal;
   a light source configured to generate a light;
   an electro-optical modulator configured to receive the light, the first driving signal, and the second driving signal, modulate the light with the first driving signal and the second driving signal, and generate an optical signal;
   wherein:
   the electrical non-return-to-zero signal includes a first plurality of bits and a second plurality of bits;
   the first input signal includes the first plurality of bits;
   the second input signal includes the second plurality of bits;
   the first driving signal is equal to the second driving signal multiplied by a negative number in signal strength;
   the optical signal is an optical return-to-zero signal.

23. The system of claim 22 wherein a sum of the first input signal and the second input signal is equal to the electrical non-return-to-zero signal.

24. The system of claim 22 wherein for the electrical non-return-to-zero signal:
   any two of the first plurality of bits are separated by at least one of the second plurality of bits;
   any two of the second plurality of bits are separated by at least one of the first plurality of bits.

25. The system of claim 24 wherein for the electrical non-return-to-zero signal: the first plurality of bits is even bits;
   the second plurality of bits is odd bits.

26. The system of claim 22, and further comprising a non-return-to-zero source configured to provide the electrical non-return-to-zero signal.

27. The system of claim 22 wherein each of the first input signal, the second input signal, the first driving signal, and the second driving signal is an electrical signal.

28. The system of claim 22 wherein the electro-optical modulator is a Mach-Zehnder modulator.

29. The system of claim 22 wherein the negative number is equal to −1.

30. A system for generating an optical return-to-zero signal, the system comprising:
   a bit separator configured to receive an electrical non-return-to-zero signal and generate a first input signal and a second input signal;
   a combiner configured to receive the first input signal and the second input signal and generate a third signal, the third signal being associated with a sum of the first input signal and the second input signal;
   a light source configured to generate a light;
   an electro-optical modulator configured to receive the light, a first driving signal, and a second driving signal, modulate the light with the first driving signal and the second driving signal, and generate an optical signal;
   wherein:
   the electrical non-return-to-zero signal includes a first plurality of bits and a second plurality of bits;
   the first input signal includes the first plurality of bits;
   the second input signal includes a third plurality of bits, the third plurality of bits equal to the second plurality of bits multiplied by a first negative number in signal strength;
   each of the first driving signal and the second driving signal is proportional to the third signal;
   the first driving signal is equal to the second driving signal multiplied by a second negative number in signal strength;
   the optical signal is an optical return-to-zero signal.

31. The system of claim 30, and further comprising:
   a first driver configured to receive the third signal and generate the first driving signal, the driving signal being proportional to the sum of the first input signal and the second input signal;
   a second driver configured to receive the third signal and generate the second driving signal, the driving signal being proportional to the sum of the first input signal and the second input signal.

32. The system of claim 30 wherein each of the first negative number and the second negative number is equal to −1.

33. The system of claim 30 wherein for the electrical non-return-to-zero signal:
   any two of the first plurality of bits are separated by at least one of the second plurality of bits;
   any two of the second plurality of bits are separated by at least one of the first plurality of bits.

34. The system of claim 33 wherein for the electrical non-return-to-zero signal:
   the first plurality of bits is even bits;
   the second plurality of bits is odd bits.

35. The system of claim 30, and further comprising a non-return-to-zero source configured to provide the electrical non-return-to-zero signal.

36. The system of claim 30 wherein each of the first input signal, the second input signal, the third signal, the first driving signal, and the second driving signal is an electrical signal.

37. The system of claim 30 wherein the electro-optical modulator is a Mach-Zehnder modulator.

* * * * *